(12) United States Patent
Barancyk et al.

(10) Patent No.: US 7,619,040 B2
(45) Date of Patent: Nov. 17, 2009

(54) COMPOSITIONS CONTAINING COPOLYMERS OF OLEFINIC MONOMERS

(75) Inventors: Steven V. Barancyk, Wexford, PA (US); Simion Coca, Pittsburgh, PA (US); Edward R. Coleridge, Lower Burell, PA (US); Gregory J. McCollum, Gibsonia, PA (US); James B. O'Dwyer, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 510 days.

(21) Appl. No.: 11/116,706

(22) Filed: Apr. 28, 2005

(65) Prior Publication Data

US 2005/0250911 A1 Nov. 10, 2005

Related U.S. Application Data

(63) Continuation-in-part of application No. 10/348,230, filed on Jan. 21, 2003, now abandoned, which is a continuation-in-part of application No. 10/077,645, filed on Feb. 15, 2002, now Pat. No. 6,784,248.

(51) Int. Cl.
*C08F 8/32* (2006.01)

(52) U.S. Cl. .......... 525/374; 525/329.9; 525/330.1; 525/375; 525/379; 525/380; 525/382; 525/384

(58) Field of Classification Search .......... 525/329.9, 525/330.1, 374, 375, 379, 380, 382, 384
See application file for complete search history.

(56) References Cited

U.S. PATENT DOCUMENTS

| | | | |
|---|---|---|---|
| 2,378,629 A | 6/1945 | Hanford | |
| 2,411,599 A | 11/1946 | Sparks et al. | |
| 2,531,196 A | 11/1950 | Brubaker et al. | |
| 2,751,367 A | 6/1956 | Yost et al. | |
| 3,183,217 A | 5/1965 | Serniuk et al. | |
| 3,494,826 A | 2/1970 | Scheiber | |
| 3,947,338 A | 3/1976 | Jerabek et al. | |
| 3,984,299 A | 10/1976 | Jerabek | |
| 4,147,679 A | 4/1979 | Scriven et al. | |
| 4,147,688 A | 4/1979 | Makhlouf et al. | |
| 4,171,413 A * | 10/1979 | Hartman et al. | 525/328.2 |
| 4,220,679 A | 9/1980 | Backhouse | |
| 4,403,003 A | 9/1983 | Backhouse | |
| 4,681,918 A | 7/1987 | Webster | |
| 4,683,286 A | 7/1987 | Krakkay et al. | |
| 4,889,890 A | 12/1989 | Kerr et al. | |
| 4,937,288 A | 6/1990 | Pettit, Jr. et al. | |
| 4,997,900 A | 3/1991 | Brinkman | |
| 5,071,904 A | 12/1991 | Martin et al. | |
| 5,098,955 A | 3/1992 | Pettit, Jr. | |
| 5,202,382 A | 4/1993 | Pettit, Jr. | |
| 5,214,101 A | 5/1993 | Pettit, Jr. et al. | |
| 5,237,027 A * | 8/1993 | Kawame et al. | 526/272 |
| 5,356,973 A | 10/1994 | Taljan et al. | |
| 5,389,178 A | 2/1995 | Harvey | |
| 5,407,707 A | 4/1995 | Simeone et al. | |
| 5,439,896 A | 8/1995 | Ito et al. | |
| 5,508,337 A | 4/1996 | Wamprecht et al. | |
| 5,510,444 A | 4/1996 | Halpaap et al. | |
| 5,552,487 A | 9/1996 | Clark et al. | |
| 5,554,692 A | 9/1996 | Ross | |
| 5,663,240 A | 9/1997 | Simeone et al. | |
| 5,710,214 A | 1/1998 | Chou et al. | |
| 5,763,548 A | 6/1998 | Matyjaszewski et al. | |
| 5,777,061 A | 7/1998 | Yonek et al. | |
| 5,789,487 A | 8/1998 | Matyjaszewski et al. | |
| 5,807,937 A | 9/1998 | Matyjaszewski et al. | |
| 5,976,701 A | 11/1999 | Barancyk et al. | |
| 5,989,642 A | 11/1999 | Singer et al. | |
| 6,111,001 A | 8/2000 | Barancyk et al. | |
| 6,114,489 A | 9/2000 | Vicari et al. | |
| 6,255,403 B1 * | 7/2001 | Andrist et al. | 525/326.1 |
| 6,281,272 B1 | 8/2001 | Baldy et al. | |
| 6,423,778 B1 | 7/2002 | McGee et al. | |
| 6,451,928 B1 | 9/2002 | Ambrose et al. | |

FOREIGN PATENT DOCUMENTS

| | | |
|---|---|---|
| GB | 1 313 792 | 4/1973 |
| GB | 1 339 981 | 12/1973 |
| WO | WO 97/18247 | 5/1997 |
| WO | WO 03/070795 A1 | 8/2003 |

\* cited by examiner

*Primary Examiner*—Bernard Lipman
(74) *Attorney, Agent, or Firm*—Robert A. Diaz; Deborah M. Altman

(57) ABSTRACT

A composition that includes a non-gelled copolymer that contains residues having structural units (I):

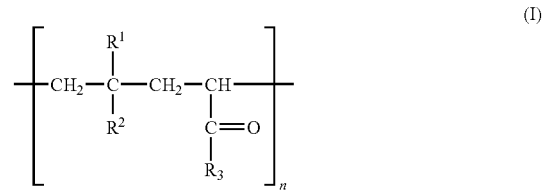

where n is an integer from 1 to 10,000; $R^1$ is linear or branched $C_1$ to $C_4$ alkyl; $R^2$ is selected from the group consisting of methyl, linear, cyclic or branched $C_2$ to $C_{20}$ alkyl, alkenyl, aryl, alkaryl and aralkyl, and $R^3$ is a group resulting from a post polymerization reaction selected from transesterification, transamidification and hydrolysis with a compound selected from hydroxy functional compounds and amine functional compounds. The composition may contain co-reactive functional groups and may be a thermosetting composition. A substrate may be coated with the thermosetting composition singly or as part of a multi-layer composite coating that includes a base coat layer and a substantially pigment free top coat layer.

25 Claims, No Drawings

COMPOSITIONS CONTAINING COPOLYMERS OF OLEFINIC MONOMERS

CROSS-REFERENCE TO RELATED APPLICATIONS

This application is a continuation-in-part application of U.S. patent application Ser. No. 10/348,230, entitled, "Compositions Containing Copolymers of Isobutylene Type Monomers," filed Jan. 21, 2003 now abandoned, incorporated herein in its entirety which is a continuation-in-part application of U.S. patent application Ser. No. 10/077,645, filed Feb. 15, 2002 now U.S. Pat. No. 6,784,248.

BACKGROUND OF THE INVENTION

1. Field of the Invention

The present invention relates generally to compositions that contain copolymers of vinyl monomers. More specifically, the present invention is directed to compositions that contain functional copolymers containing olefinic monomers and thermosetting compositions thereof.

2. Description of Related Art

Functional polymers used in liquid, powder, and electrodepositable coating compositions are typically random copolymers that include functional group-containing acrylic and/or methacrylic monomers. Such a functional copolymer will contain a mixture of polymer molecules having varying individual functional equivalent weights and polymer chain structures. In such a copolymer, the functional groups are located randomly along the polymer chain. Moreover, the number of functional groups is not divided equally among the polymer molecules, such that some polymer molecules may actually be free of functionality.

Additionally, attempts to introduce functionality into acrylic or methacrylic ester containing homopolymers and copolymers by reacting the polymer with an appropriate functional compound after polymerization can result in the formation of cyclic structures along the polymer backbone where acrylic and or methacrylic residues are positioned next to each other along the polymer chain, i.e. nearest neighbors. The formation of cyclic structures occurs when nearest neighbor acrylic or methacrylic residues each react with a functional group in the functional compound resulting in a pendant linkage between the nearest neighbor acrylic or methacrylic residues. The result is a loss of functionality in the polymer as well as an undesirable change in physical properties such as glass transition temperature, solubility and compatibility with other materials.

As an example, in thermosetting compositions, the formation of a three-dimensional crosslinked network is dependent on the available functionality, the functional equivalent weight as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed thermoset coating.

It would, therefore, be desirable to provide compositions that include functional acrylic and/or methacrylic copolymers that are free of undesirable cyclization reactions and provide unencumbered access to the functional groups therein to participate in desired reactions, such as thermosetting and curing reactions.

SUMMARY OF THE INVENTION

The present invention provides a composition that includes a non-gelled copolymer that contains residues along the copolymer backbone having the following structural units (I):

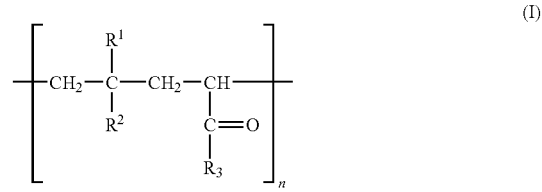

wherein n is an integer from 1 to 10,000; $R^1$ is linear or branched C1 to C4 alkyl; $R^2$ is selected from the group consisting of methyl, linear, cyclic or branched C2 to C20 alkyl, alkenyl, aryl, alkaryl and aralkyl, and $R^3$ is selected from:

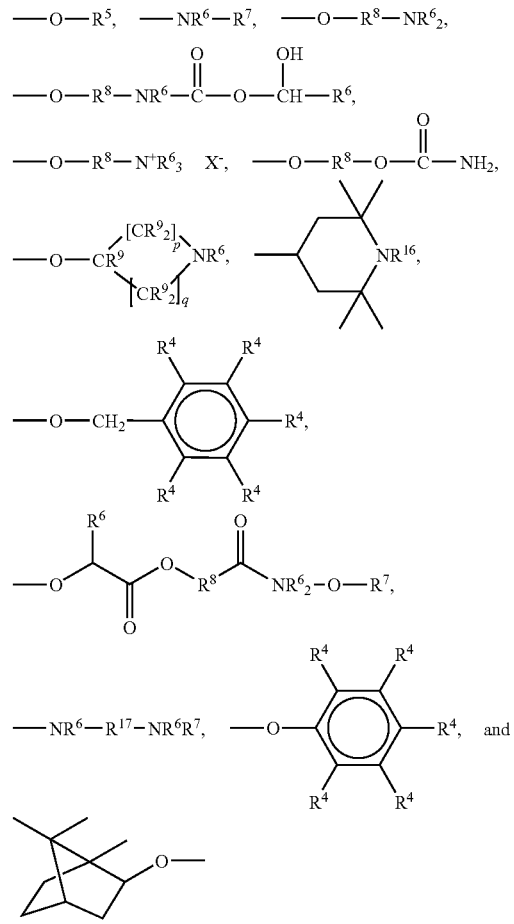

where each occurrence of $R^4$ is independently selected from hydrogen and $C_1$ to $C_4$ alkyl, $R^5$ is a radical selected from linear, cyclic or branched $C_2$ to $C_{20}$ alkenyl, aryl, alkaryl, aralkyl, alkylol, aralkylol, alkyl thiol, aralkyl thiol, alkyl isocyanate, aralkyl isocyanate, blocked alkyl isocyanate, blocked alkaryl isocyanate and radicals derived from, polyesters, polyethylene glycol and polypropylene glycol, each occurrence of $R^6$ is independently selected from hydrogen and $C_1$ to $C_4$ alkyl and alkylol, $R^7$ is selected from H, methyl, linear, cyclic or branched $C_2$ to $C_{20}$ alkyl, alkenyl, aryl, alkaryl, aralkyl, alkylol, aralkylol, alkyl thiol, aralkyl thiol and polyamide radicals, $R^8$ is a linking group selected from linear, cyclic or branched $C_2$ to $C_{20}$ alkylene, alkenylene, arylene, alkarylene, aralkylene and oxyalkalene, $R^{16}$ is selected from hydrogen, $C_1$ to $C_4$ alkyl, —OH, —$OR^7$ and —C(O)—$R^7$, $R^{17}$ is a radical derived from polyethylene glycol, polypropylene glycol and mixtures thereof, p and q are each independently from 0 to 6 and the sum of p+q is at least 2 and not more than 8, each occurrence of $R^9$ is independently selected from hydrogen and $C_1$ to $C_4$ alkyl, and X is an anion derived from one or more organic or inorganic acids, and wherein the copolymer backbone is substantially free of residues, derived from maleic acid, fumaric acid, itaconic acid, anhydrides thereof, and derivatives thereof.

The present invention also provides a composition that includes the reaction product of a reactant selected from hydroxy functional compounds and amine functional compounds with a copolymer that includes residues of the structure

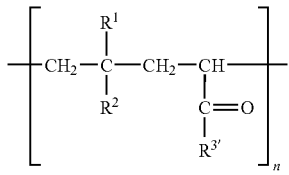

where n is an integer of from 1 to 10,000, $R^1$ is linear or branched $C_1$ to $C_4$ alkyl; $R^2$ is selected from methyl, linear, cyclic or branched $C_2$ to $C_{20}$ alkyl, alkenyl, aryl, alkaryl and aralkyl and —C(O)—$R^{3'}$ is a group that is capable of a reaction selected from transesterification, transamidification and hydrolysis with the hydroxy functional compounds or the amine functional compounds, wherein the copolymer backbone is substantially free of residues derived from maleic acid, fumaric acid, itaconic acid, anhydrides thereof, and derivatives thereof.

The present invention is further directed to a method of making a copolymer including the steps of:
(a) providing a monomer composition that includes:
  (i) at least one monomer having the formula $CH_2$=$CR^1R^2$; and
  (ii) at least one monomer having the formula $CH_2$=CH—C(O)—$R^{3'}$;
(b) polymerizing the monomer composition to form a copolymer wherein the monomer composition is substantially free of maleic acid, fumaric acid, itaconic acid, anhydrides thereof, and derivatives thereof; and
(c) reacting the copolymer with a reactant selected from hydroxy functional compounds and amine functional compounds to form a non-gelled reacted copolymer, wherein $R^{3'}$ is a group that is capable of a reaction selected from transesterification, transamidification and hydrolysis with the reactant.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein and in the claims, the term "copolymer composition" is meant to include a synthesized copolymer as well as residues from initiators, catalysts, other elements attendant to the synthesis of the copolymer, but not covalently incorporated thereto and other materials, compounds and the like that may be intentionally mixed with the copolymer. Such residues and other elements considered as part of the copolymer composition are typically mixed or co-mingled with the copolymer such that they tend to remain with the copolymer when it is transferred between vessels or between solvent or dispersion media.

As used herein and in the claims, the term "substantially free" is meant to indicate that a material is present as an incidental impurity. In other words, the material is not intentionally added to an indicated composition, but may be present at minor or inconsequential levels because it was carried over as an impurity as part of an intended composition component.

The present invention is directed to a composition that includes a non-gelled copolymer. As used herein and in the claims, the terms "non-gelled" or "ungelled" refer to reaction products that are substantially free of crosslinking and have a measurable intrinsic viscosity when dissolved in a suitable solvent. The intrinsic viscosity is determined by plotting reduced viscosity versus concentration and extrapolating to zero concentration as is well known in the art. A gelled reaction product, on the other hand, since it is of essentially infinitely high molecular weight, will have an intrinsic viscosity too high to measure.

The non-gelled copolymer includes residues of polymerizable ethylenically unsaturated monomers and contains, along its backbone, the following structural units of formula I:

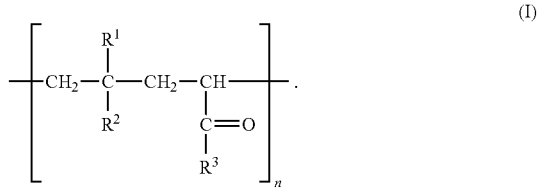

In Formula I, n is an integer of at least 1, such as at least 2, or at least 3, or at least 4, or at least 5 or at least 6. The integer n may be as high as 10,000, such as up to 7,500, or up to 5,000, or up to 2,500, or up to 1,000, or up to 500, or up to 100, or up to 50, or up to 25. The integer n in formula I may vary between any of the values recited above.

In formula I, $R^1$ may be a linear or branched $C_1$ to $C_4$ alkyl group. $R^2$, in formula I may be any group selected from methyl, linear, cyclic or branched $C_2$ to $C_{20}$ alkyl, alkenyl, aryl, alkaryl and aralkyl. As used herein and in the claims, the term "linear" refers to hydrocarbon and/or polymer chains that substantially in a straight line. As used herein and in the claims, the term "cyclic" refers to any compound or structural unit of a compound that is made up of a ring of atoms covalently bonded together. As used herein and in the claims, the term "branched" refers to hydrocarbon and/or polymer chains that contain side chains connected or otherwise covalently bonded to the main chain. As used herein and in the claims, the term "alkyl" refers to a saturated hydrocarbon having the general formula $C_nH_{2n+1}$ covalently bonded to another atom, compound or molecule. As used herein and in the claims, the term "alkenyl" refers to a hydrocarbon that contains one or more carbon-carbon double bonds.

As used herein and in the claims, the term "aryl" refers to a group obtained by removing a hydrogen atom from an aromatic compound, non-limiting examples of which include phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl. As used herein and in the claims, the term "aralkyl" refers to an aryl group, where one or more of the hydrogen atoms have been substituted or replaced with an alkyl group of from 1 to 24 carbon atoms. As used herein and in the claims, the term "alkaryl" refers to a group that contains an alkyl group of from 1 to 24 carbon atoms where one or more of the hydrogen atoms have been substituted or replaced with an aryl group.

As used herein and in the claims, the term "alkylol" refers to any alkyl or alkenyl group where one or more hydrogen atoms have been replaced or substituted with a hydroxyl group. As used herein and in the claims, the term "aralkylol" refers to an aralkyl group where one or more hydrogen atoms have been replaced or substituted with a hydroxyl group. As used herein and in the claims, the term "alkyl thiol" refers to any alkyl or alkenyl group where one or more hydrogen atoms have been replaced or substituted with an —SH group. As used herein and in the claims, the term "aralkyl thiol" refers to an aralkyl group where one or more hydrogen atoms have been replaced or substituted with a —SH group.

As used herein and in the claims, the term "alkyl isocyanate" refers to any alkyl or alkenyl group where one or more hydrogen atoms have been replaced or substituted with a —NCO group. As used herein and in the claims, the term "aralkyl isocyanate" refers to an aralkyl group where one or more hydrogen atoms have been replaced or substituted with a —NCO group.

As used herein and in the claims, the terms "capped isocyanate" or "blocked isocyanate" refer to isocyanate groups where the —NCO group has been reacted with an appropriate "capping" or "blocking" agent. Suitable capping or blocking agents include, but are not limited to hydroxy functional compounds, such as ethylene glycol butyl ether, phenol and p-hydroxy methylbenzoate; 1H-azoles, such as 1H-1,2,4-triazole and 1H-2,5-dimethylpyrazole; lactams, such as e-caprolactam and 2-pyrolidone; ketoximes, such as 2-propane oxime and 2-butanone oxime and those described in U.S. Pat. No. 5,508,337 at column 7, lines 11 through 22, the disclosure of which is incorporated herein by reference. Other capping groups include morpholine, 3-aminopropyl morpholine and n-hydroxy phthalimide.

In formula I, $R^3$ is selected from formulas II-XIV:

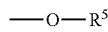 (II)

 (III)

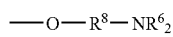 (IV)

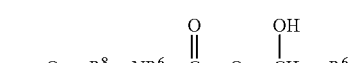 (V)

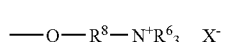 (VI)

-continued

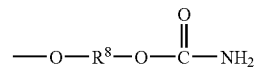 (VII)

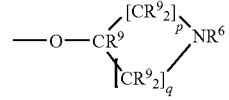 (VIII)

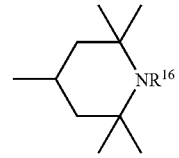 (IX)

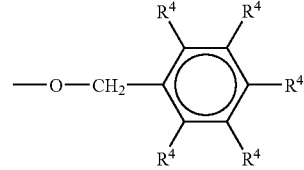 (X)

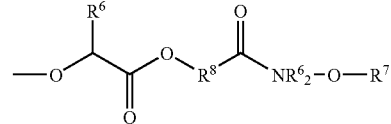 (XI)

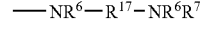 (XII)

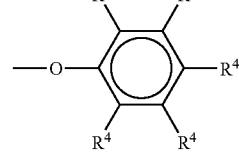 (XIII)

 (XIV)

In formulas II-XIV, each occurrence of $R^4$ is independently selected from hydrogen and $C_1$ to $C_4$ alkyl. $R^5$ is a radical selected from linear, cyclic or branched $C_2$ to $C_{20}$ alkenyl, aryl, alkaryl, aralkyl, alkylol, aralkylol, alkyl thiol, aralkyl thiol, alkyl isocyanate, aralkyl isocyanate, blocked alkyl isocyanate, blocked alkaryl isocyanate and radicals derived from, polyesters, polyethylene glycol and polypropylene glycol, each occurrence of $R^6$ is independently selected from hydrogen and $C_1$ to $C_4$ alkyl and alkylol, $R^7$ is selected from of H, methyl, linear, cyclic or branched $C_2$ to $C_{20}$ alkyl, alkenyl, aryl, alkaryl, aralkyl, alkylol, aralkylol, alkyl thiol, aralkyl thiol and polyamide radiclas, $R^8$ is a linking group selected from linear, cyclic or branched $C_2$ to $C_{20}$ alkylene, alkenylene, arylene, alkarylene, aralkylene and oxyalkalene, $R^{16}$ is selected from hydrogen, $C_1$ to $C_4$ alkyl, —OH, —OR$^7$ and —C(O)—R$^7$, $R^{17}$ is a radical derived from polyethylene glycol, polypropylene glycol and mixtures thereof, p and q are each independently from 0 to 6 and the sum of p+q is at least 2 and not more than 8, each occurrence of $R^9$ is independently selected from hydrogen and $C_1$ to $C_4$ alkyl, and X is an anion derived from one or more organic or inorganic acids.

When $R^5$ is a polyester residue, it is typically derived from a hydroxy functional polyester. Useful hydroxy functional polyesters typically include the esterification product of a polycarboxylic acid or an anhydride thereof with a polyol and/or an epoxide. As a non-limiting example, the polyol may be a linear or cyclic polyol. Useful cyclic polyols can include any of a variety of polyhydric cyclic compounds well known in the art. Non-limiting examples of cyclic polyols include Bisphenol A, Bisphenol F, Bisphenol E, M, P, Z, and the like, hydrogenated Bisphenol A, hydrogenated Bisphenol F, hydrogenated Bisphenol E, M, P, Z, and the like cyclohexyl dimethanol, cyclohexane diol and mixtures thereof. Polyols that can be used to prepare the polyester include diols such as alkylene glycols. Non-limiting examples of linear polyols include ethylene glycol, 1,6-hexanediol, neopentyl glycol, 2,2-dimethyl-3-hydroxypropyl-2,2-dimethyl-3-hydroxypropionate and polyether glycols such as poly(oxytetramethylene)glycol, and the like.

As a non-limiting example, the polycarboxylic acid may be a linear or cyclic polycarboxylic acid or anhydride. The cyclic polycarboxylic acid or anhydride can be any cyclic compound having two or more carboxylic acid groups per molecule. Non-limiting examples of suitable cyclic polycarboxylic acids or anhydrides include hexahydrophthalic acid; phthalic acid, isophthalic acid, terephthalic acid, trimellitic acid, anhydrides thereof, and mixtures thereof. Non-limiting examples of linear carboxylic acids include adipic acid, sebacic acid, maleic acid, fumaric acid, tricarballylic acid, anhydrides thereof, and mixtures thereof.

The hydroxy functional polyester may be prepared by any of the various methods known in the art, non-limiting examples of which are disclosed in U.S. Pat. No. 6,451,928 to Ambrose et al.

When $R^7$ is a polyamide residue, it is typically derived from an amine functional polyamide. Useful amine functional polyamides typically include the condensation product of a polycarboxylic acid or an anhydride thereof with a polyamine, as is well known in the art. In an embodiment of the present invention, the polyamine may be one or more diamines. The diamines used in the preparation of the polyamide may be one or more of the known aliphatic, cycloaliphatic or aromatic diamines having from about 2 to about 20 carbon atoms. Non-limiting examples of suitable diamines include ethylene diamine, 1,3-diaminopropane, 1,4-diaminobutane, p-xylene diamine, 1,6-hexamethylene diamine, cyclohexyl amine, bis(4-cyclohexylamine)methane, 2,2'-bis(4-cyclohexylamine)propane, polyglycol diamines, isophorone diamine, m-xylene diamine, cyclohexylbis(methylamines), polyoxyalkylenediamine (examples of which include the JEFFAMINE diamines available from Huntsman, Austin, Tex.), 2-methyl-1,5-pentane diamine, 1,4-bis-(2-aminoethyl)benzene, dimer diamine, polyether diamines, methylpentamethylene diamine, and piperazine. As a non-limiting example, the polycarboxylic acid may be a linear or cyclic polycarboxylic acid or anhydride as described above.

Useful polyamides include those available under the tradename VERSAMID, available from Cognis Corp., Cincinnati, Ohio.

In formula 1, $R^3$ may be a residue that is incorporated into the copolymer by first copolymerizing a monomer having the formula $CH_2=CH-C(O)-R^3$, where $R^{3'}$ is a group that is capable of a reaction selected from transesterification, transamidification and hydrolysis, a non-limiting example of which is a group $-O-R^{33}$, where $R^{33}$ is $C_1-C_4$ alkyl, with a monomer $CH_2=CR^1R^2$ and post-reacting the copolymer through a transesterification, transamidation or hydrolysis reaction.

In the present copolymer, the structural units (I) may be present at a level of at least 30 mol %, in some cases at least 40 mol %, in other cases at least 50 mol %, in some situations at least 60 mol %, in other situations at least 75 mol % of the copolymer and in particular cases, the copolymer include 100% of repeating residues of structural units (I). The amount of structural units (I) in the copolymer will depend on the desired properties required of the copolymer, including the degree of functionality.

When the copolymer does not include 100% of repeating residues of structural units (I), the copolymer may include residues having the structural units (XV):

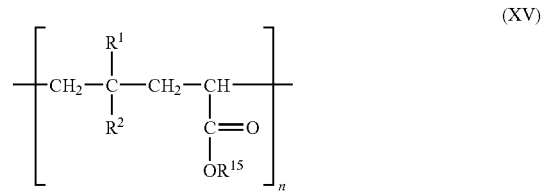

wherein $R^1$, $R^2$ and n are as defined above and $R^{15}$ is selected from the group consisting of methyl, ethyl, linear, cyclic or branched $C_3$ to $C_{20}$ alkyl, alkenyl, aryl, alkaryl and aralkyl. Residues having structural units (XV) may result from specific transesterification reactions or remain as unreacted acrylate ester residues after a transesterification, transamidation or hydrolysis has been performed.

Structural units (XV) may be present in the copolymer at trace levels of up to 0.5 mol %, or structural units (XV) may be present, in some cases, up to 1 mol %, in other cases up to 5 mol % and in some situations up to 10 mol % of the copolymer when structural units (XV) result from incomplete reaction. When structural units (XV) provide specific desirable characteristics to the copolymer, structural units (XV) may be present at a level of at least 1 mol %, in some cases at least 5 mol %, in other cases at least 10 mol %, in some situation at least 20 mol %, in other situations at least 30 mol % and in some instances at least 40 mol % of the copolymer. Additionally, structural units (XV) may be present at up to 70 mol %, in some cases up to 60 mol % and in other cases up to 50 mol % of the copolymer. The level of structural units (XV) may vary between any of the levels recited above.

In an embodiment of the present invention, the copolymer may include one or more residues derived from other ethylenically unsaturated monomers of general formula XVI:

where $R^{11}$, $R^{12}$, and $R^{14}$ are independently selected from H, halides, $CF_3$, straight or branched alkyl of 1 to 20 carbon atoms, aryl of 6 to 12 carbon atoms, unsaturated straight or branched alkenyl or alkynyl of 2 to 10 carbon atoms, unsaturated straight or branched alkenyl of 2 to 6 carbon atoms substituted with a halogen, $C_3-C_8$ cycloalkyl, heterocyclyl and phenyl, $R^{13}$ is selected from H, halides, $C_1-C_6$ alkyl, COOR$^{18}$, wherein R$^{13}$ is selected H, an alkali metal, a C$_1$ to C$_6$ alkyl group, glycidyl and aryl. In a particular embodiment of the present invention, the other ethylenically unsaturated monomers of formula XVI are one or more selected from methacrylic monomers and allylic monomers.

As used herein and in the claims, by "allylic monomers" is meant monomers containing substituted and/or unsubstituted allylic functionality, i.e., one or more radicals represented by the following general formula XVII,

H$_2$C=C(R$_{16}$)—CH$_2$—    (XVII)

where R$_{16}$ is hydrogen, halogen or a C$_1$ to C$_4$ alkyl group. Most commonly, R$_{16}$ is hydrogen or methyl and, consequently, general formula XII represents the unsubstituted (meth)allyl radical. Examples of allylic monomers may each independently be residues of, but are not limited to, (meth)allyl ethers, such as methyl(meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

As used herein and in the claims, by "methacrylic monomers" is meant monomers containing substituted and/or unsubstituted methacrylic functionality, i.e., one or more radicals represented by the following general formula XVIII,

H$_2$C=C(CH$_3$)—C(O)—    (XVIII)

Specific examples of methacrylic monomers that may be included in the copolymer include, but are not limited to methacrylic acid, methacrylamide, N- and N,N-di-substituted methacrylamides, C$_1$-C$_{24}$ alkyl methacrylates (including linear or branched alkyls and cycloalkyls) which include, but are not limited to, methyl methacrylate, ethyl methacrylate, propyl methacrylate, isopropyl methacrylate, n-butyl methacrylate, iso-butyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate and isooctane methacrylate; oxirane functional methacrylates which include, but are not limited to, glycidyl methacrylate, 3,4-epoxycyclohexylmethyl methacrylate, and 2-(3,4-epoxycyclohexyl)ethyl methacrylate; hydroxy alkyl methacrylates having from 2 to 4 carbon atoms in the alkyl group which include, but are not limited to, hydroxyethyl methacrylate, hydroxypropyl methacrylate and hydroxybutyl methacrylate. The residues may each independently be residues of monomers having more than one methacryloyl group, such as methacrylic anhydride, diethyleneglycol bismethacrylate, 4,4'-isopropylidenediphenol bismethacrylate (Bisphenol A dimethacrylate), alkoxylated 4,4'-isopropylidenediphenol bismethacrylate, trimethylolpropane trismethacrylate and alkoxylated trimethylolpropane trismethacrylate.

As previously mentioned, the copolymer used in the composition of the present invention is substantially free of residues derived from maleic acid, fumaric acid, itaconic acid, anhydrides thereof, and derivatives thereof.

As used herein and in the claims, unless otherwise specified, the term "molecular weight" refers to number average molecular weight as determined by gel permeation chromatography using polystyrene standards. As used herein and in the claims, the term "polydispersity index" or "PDI" refers to the weight average molecular weight (Mw) divided by the number average molecular weight (Mn) of the copolymer as determined by gel permeation chromatography using polystyrene standards.

The molecular weight of the copolymer will vary depending on a given desired use and/or desired physical properties and may be as high as 1,000,000 or as low as 250. The molecular weight of the copolymer may be at least 500, in some cases at least 1,000, in other cases at least 1,500, in some situations at least 2,000 and in other situations at least 2,500. The molecular weight of the copolymer may be up to 10,000, in some cases up to 14,000, in other cases up to 16,000, in some situations up to 25,000, in other situations up to 50,000, in instances requiring high molecular weight up to 100,000, in other such instances up to 250,000 and in certain high molecular weight requirements up to 500,000. The molecular weight of the copolymer may vary between any of the values recited above.

The PDI of the copolymer may vary depending on the requirements of the desired use or application as well as the method used to prepare the copolymer. The PDI is typically at least 1, often at least 1.25 or at least 1.5. The PDI may be less than 3, less than 4 and in other cases at less than 5 and in some situations less than 7. Some polymerization methods result in large PDIs, which for the present copolymer may be as high as 30, in some cases up to 25, in other cases up to 20, in some polymerization methods up to 15 and in other methods up to 10. The PDI may vary between any of the levels recited above.

As was mentioned above, the present composition may include the reaction product of a reactant selected from hydroxy functional compounds and amine functional compounds with a copolymer comprising residues of structure (XIX):

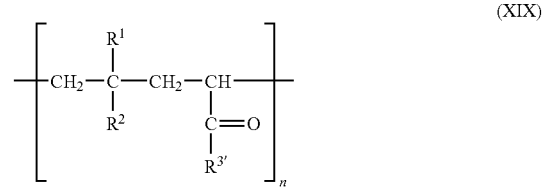

where n is an integer as defined above, R$^1$ is linear or branched C$_1$ to C$_4$ alkyl; R$^2$ is selected from the group consisting of methyl, linear, cyclic or branched C$_2$ to C$_{20}$ alkyl, alkenyl, aryl, alkaryl and aralkyl and —C(O)—R$^{3'}$ is a group that is capable of a reaction selected from transesterification, transamidification and hydrolysis with the hydroxy functional compounds or the amine functional compounds. The copolymer backbone is substanitally free of residues derived from maleic acid, fumaric acid, itaconic acid, anhydrides thereof, and derivatives thereof. Non-limiting examples of R$^{3'}$ are a group —O—R$^{33}$, where R$^{33}$ is C$_1$ to C$_4$ alkyl, such as methyl, ethyl, linerar or branched propyl or butyl.

In an embodiment of the present invention, the residue structural unit —CH$_2$—CH(CO—R$^3$)— may be derived from a nitrile containing moiety —CH$_2$—CH(CN)—. In other words, the residues of the structural unit may be derived from a nitrile containing copolymer that has been hydrolyzed. Such a structural feature can be obtained, for example, by utilizing acrylonitrile as a comonomer. The nitrile containing moiety may be converted to the corresponding amide or carboxylic acid through hydrolysis via methods well known in the art.

Any suitable hydroxy compound may be used in the present invention. Suitable hydroxy compounds include, but are not limited to water and hydroxy functional compounds selected from structures XX-XXIX.

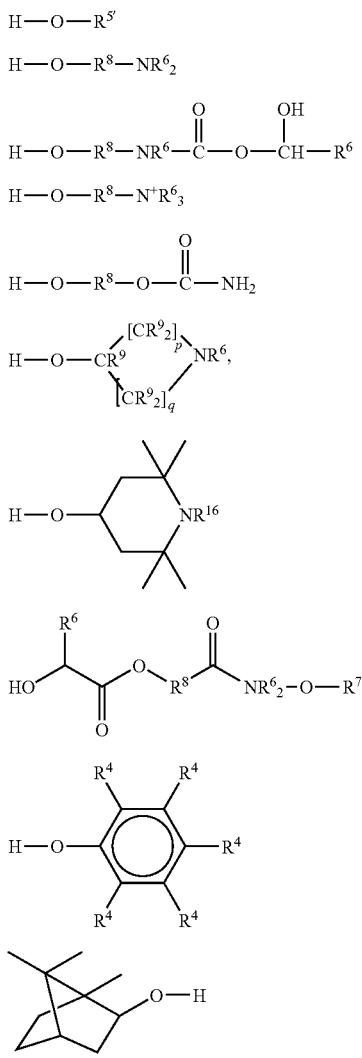

Any suitable amine may be used in the present invention. Suitable amines include, but are not limited to amine functional compounds selected from structures XXX and XXXI.

For structures XX-XXXI, each occurrence of $R^4$ is independently selected from hydrogen and $C_1$ to $C_4$ alkyl, $R^{5'}$ is a radical selected from linear, cyclic or branched $C_2$ to $C_{20}$ alkyl, alkenyl, aryl, alkaryl, aralkyl, alkylol, aralkylol, alkyl thiol, aralkyl thiol, alkyl isocyanate, aralkyl isocyanate, blocked alkyl isocyanate, blocked alkaryl isocyanate and radicals derived from, polyesters, polyethylene glycol or polypropylene glycol, each occurrence of $R^6$ is independently selected from hydrogen and $C_1$ to $C_4$ alkyl and alkylol, $R^7$ is selected from H, methyl, linear, cyclic or branched $C_2$ to $C_{20}$ alkyl, alkenyl, aryl, alkaryl, aralkyl, alkylol, aralkylol, alkyl thiol, aralkyl thiol and polyamide radicals, $R^8$ is a linking group selected from linear, cyclic or branched $C_2$ to $C_{20}$ alkylene, alkenylene, arylene, alkarylene, aralkylene and oxyalkylene, $R^{16}$ is selected from hydrogen, $C_1$ to $C_4$ alkyl, —OH, —$OR^7$ and —C(O)—$R^7$, $R^{17}$ is a radical derived from polyethylene glycol, polypropylene glycol and mixtures thereof, p and q are each independently from 0 to 6 and the sum of p+q is at least 2 and not more than 8, each occurrence of $R^9$ is independently selected from hydrogen and $C_1$ to $C_4$ alkyl, and X is an anion derived from one or more organic or inorganic acids.

Non-limiting examples of suitable alcohols corresponding to structure XX include, but are not limited to alkyl alcohols such as ethanol, n-propanol, isopropanol, n-butanol, t-butanol, n-hexanol, n-octanol; polyalkylene glycols such as ethylene glycol, propylene glycol, glycerin, diethyleneglycol, dipropyleneglycol, polyethylene glycol, polypropylene glycol and hydroxy functional polyesters.

Non-limiting examples of suitable alcohols corresponding to structure XXI include, but are not limited to ethanol amine, N,N-dimethylaminoethanol, diglycol amine, 3-amino-1-propanol, 2-amino-1-propanol, 4-amino-1-butanol, 2-amino-1-butanol, and higher amino alkylols, polyethyleneoxide mono amines such as JEFFAMINE XTJ-506 and JEFFAMINE M-2070 available from Huntsman Performance Chemicals, Austin, Tex. and polypropyleneoxide mono amines such as JEFFAMINE XTJ-505 and JEFFAMINE XTJ-507 available from Huntsman.

Non-limiting examples of suitable alcohols corresponding to structure XXII include, but are not limited to the reaction products of amino alcohols, including those specifically recited above and alkylene carbonates. Suitable alkylene carbonates include, but are not limited to ethylene carbonate, propylene carbonate, butylene carbonate and those available commercially under the JEFFSOL tradename from Huntsman.

Non-limiting examples of suitable alcohols corresponding to structure XXIII include, but are not limited to amine salts of the amino alcohols specifically recited above with inorganic acids, such as HCl and HBr as well as quaternized amino alcohols. The quaternized amino alcohols may be prepared by reacting any of the amino alcohols recited above with a suitable quaternization agent. Suitable quaternizing agents include, but are not limited to propylene oxide, $CH_3Cl$, $CH_3Br$, $CH_3I$, $CH_3CH_2Cl$, $CH_3CH_2Br$, $CH_3CH_2I$ diethyl sulfate and dimethyl sulfate.

Non-limiting examples of suitable hydroxy alkyl carbamates corresponding to structure XXIV include, but are not limited to hydroxy alkyl carbamates such as hydroxy ethyl carbamate, hydroxy propyl carbamate and hydroxy butyl carbamate and oxyalkylene glycol carbamates such as polyethyleneglycol carbamate and polypropylene glycol carbamate.

Non-limiting examples of suitable cycloalkyl hydroxy amines corresponding to structure XXV include, but are not limited to 2-hydroxypiperidine, 3-hydroxypiperidine, 4-hydroxypiperidine, 2-pyrrolidinol, 3-pyrrolidinol and 2-methyl-3-pyrrolidinol.

A non-limiting examples of suitable cycloalkyl hydroxy amines corresponding to structure XXVI include, but are not limited to 2,2,6,6-tetramethyl-4-hydroxypiperidine.

Non-limiting examples of suitable amines corresponding to structure XXX include, but are not limited to 3-amino-1,2-propanediol, diethanolamine, dimethylamine, diethyl amine and amine functional polyamides.

Non-limiting examples of suitable diamines corresponding to structure XXXI include, but are not limited to alkyl diamines such as ethylene diamine, propylene diamine, butylene diamine, hexamethylene diamine, 1,4-cyclohexane diamine, triethyleneglycol diamine such as JEFFAMINE EDR-148 from Huntsman, polyoxyethylene diamines such as JEFFAMINE XTJ-502 available from Huntsman and polyoxypropylene diamines such as JEFFAMINE D-230, JEF- FAMINE D-400 and JEFFAMINE D-2000 available from Huntsman. In an embodiment of the present invention, polyamines may be used in place of the diamine. Suitable polyamines include, but are not limited to melamine, triethylenetetramine, hexamethylene tetramine, tris(2-aminoethyl) amine, and polyoxypropylene triamines such as JEFFAMINE T-403, JEFFAMINE T-3000 and JEFFAMINE T-5000 available from Huntsman.

In structures I and XIX, the residue —$CH_2$—$CR^1R^2$— is typically derived from an olefin. In an embodiment of the present invention, the copolymer is derived from one or more olefin monomers selected from isobutylene, diisobutylene, dipentene and isoprenol.

In a further embodiment of the present invention, the group $R^{3'}$, which readily undergoes a transesterification, transamidification and/or hydrolysis reaction, may be a group —O—$R^{33}$, where $R^{33}$ is $C_1$ to $C_4$ alkyl.

In an additional embodiment of the present invention, the hydroxy compound may include amine functionality, such that after a transesterification reaction, the copolymer contains amine functionality. In a particular embodiment, the amine functionality is a primary amine. When the copolymer includes amine functionality, the amine may be further reacted to provide other functional groups.

As a non-limiting example, when the copolymer includes amine functionality, the amine functionality may be reacted with phosgene to form an isocyanate.

In a further non-limiting example, the amine functionality is reacted with an alkylene carbonate to form the corresponding alkylene hydroxy carbamate. In an embodiment of this example, the alkylene carbonate may be is selected from ethylene carbonate, propylene carbonate and butylene carbonate.

The present invention is also directed to a method of making the above described composition and copolymer therein. The method includes the steps of:

(a) providing a monomer composition comprising:
   (i) at least one monomer having the formula $CH_2$=$CR^1R^2$; and
   (ii) at least one monomer having the formula $CH_2$=CH—C(O)—$R^3$, where $R^1$, $R^2$ and $R^3$ are as defined above;
(b) polymerizing the monomer composition to form a copolymer; and
(c) reacting the copolymer with a reactant selected from hydroxy functional compounds and amine functional compounds to form a non-gelled reacted copolymer, wherein $R^{3'}$ is a group that is capable of a reaction selected from transesterification, transamidification and hydrolysis with the reactant. The monomer composition from which the copolymer is prepared is substantially free of maleic acid, fumaric acid, itaconic acid, anhydrides thereof, and derivatives thereof.

The monomer composition may be polymerized using any suitable polymerization method. Suitable polymerization methods include, but are not limited to free radical polymerization methods such as traditional random free radical polymerization methods and photopolymerization methods or controlled free radical polymerization processes such as group transfer polymerization as disclosed, for example, in U.S. Pat. No. 4,681,918 and atom transfer radical polymerization as disclosed, for example, in U.S. Pat. Nos. 5,807,937, 5,789,487 and 5,763,548, all of which are herein incorporated by reference, and ionic polymerization methods such as anionic polymerization and cationic polymerization as are well known in the art.

When traditional random free radical polymerization methods are used, a free radical initiator is typically used in the polymerization process. Any suitable free radical initiator may be used. Suitable free radical initiators include, but are not limited to thermal initiators, photoinitiators and oxidation-reduction initiators. Examples of thermal initiators include, but are not limited to azo compounds, peroxides and persulfates. Suitable persulfates include, but are not limited to sodium persulfate and ammonium persulfate. Oxidation-reduction initiators may include, as non-limiting examples persulfate-bisulfite systems as well as systems utilizing thermal initiators in combination with appropriate metal ions such as iron or copper.

The structural units depicted in structure (XIX) are associated with a copolymer containing alternating monomer residues of the following structures:

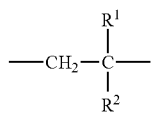

(XIXA)

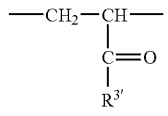

(XIXB)

where the monomer residue (XIXA) is derived from a so called "donor" monomer and the monomer residue (XIXB) is derived from a so called "acceptor" monomer.

The alternating copolymer depicted by structure (XIX) may contain at least 30 mol % of alternating monomer residues, in some cases at least 40 mol %, in other cases at least 50 mol %, in some situations at least 60 mol %, in other situations at least 75 mol % and in some instances the copolymer contains 100 mol % of the alternating monomer residues depicted in structure (XIX).

The concept of "donor" monomers and "acceptor monomers" has been described and has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309-319 (1999)). All e values recited herein are those appearing in the Polymer Handbook unless otherwise indicated.

In the Q-e scheme, Q reflects the reactivity of a monomer and e represents the polarity of a monomer. A positive value for e indicates that a monomer is an acceptor monomer. A low or negative value for e indicates that a monomer is a donor monomer.

As referred to herein, a "strong acceptor monomer" is meant to include those monomers with an e value greater than 2.0. The term "mild acceptor monomer" is meant to include those monomers with an e value greater than 0.5 up to and including those monomers with an e value of 2.0. The donor monomers of structure XIXA are "mild donor monomers" which is meant to include those monomers with an e value of less than 0.5 to those with an e value of −1.5.

Typically, at least 10 mol % of the copolymer is derived from the following donor monomer:

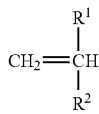
(XIXC)

where $R^1$ and $R^2$ are defined above in structure XIX. Further, at least 10 mol % of the copolymer is derived from an acceptor monomer of the following structure:

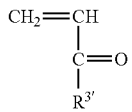
(XIXD)

where $R^{3'}$ is defined above in structure XIX.

Of note in the present copolymer is that the copolymer incorporates a substantial portion of alternating residues of a mild donor monomer as described by structure XIX(C) and a mild acceptor monomer, which is an acrylic monomer as depicted in structure XIX(D). A non-limiting list of published e values for monomers that may be included as monomers described by structure XIX(C) and acrylic monomers of structure XIX(D) are shown in Table 1.

TABLE 1

Alfrey-Price e values for Selected Monomers

| Monomer | e value |
|---|---|
| Monomers of structure XIX(C) | |
| Isobutylene | −1.20[1] |
| Diisobutylene | 0.49[2] |
| Acrylic Monomers of structure XIX(D) | |
| Methyl acrylate | 0.64[1] |
| Ethyl acrylate | 0.55[1] |
| Butyl acrylate | 0.85[1] |

[1] Polymer Handbook, Fourth Edition (1999)
[2] Rzaev et al., Eur. Polym. J., Vol. 24, No. 7, pp. 981-985 (1998)

Examples of suitable donor monomers are isobutylene, diisobutylene, dipentene, 1-octene and isoprenol.

The mild donor monomer residue of structure XIX(C) can be present in the copolymer composition at a level of at least 10 mol %, in some cases at least 15 mol %, in some cases at least 20 mol %, and in other cases at least 25 mol %. The mild donor monomer residues of structure XIX(C) also can be present in the copolymer composition at a level of up to 50 mol %, in some cases up to 45 mol %, in other cases up to 40 mol %, in some situations up to 35 mol % and in other situations up to 35 mol %. Analogously, for the copolymer in structure (i), the monomer residues —$CH_2$—$CR_1$, $R_2$— are present in the same amounts as the mild donor monomer residues.

Examples of suitable acceptor monomers that may be used in the present invention include methyl acrylate, ethyl acrylate, n-butyl acrylate and isobutyl acrylate.

The acrylic acceptor monomer residues of structure XIX (D) are present in the copolymer composition at a level of at least 10 mol %, in some cases at least 15 mol %, in some cases at least 20 mol %, and in other cases at least 25 mol %. The acrylic acceptor monomer residues of structure XIX(D) are present in the copolymer composition at a level of up to 50 mol %, in some cases up to 45 mol %, and, in some cases up to 40 mol %, in some situations up to 35 mol %, in other situations up to 35 mol %, in other situations up to 30 mol %.

Suitable other acceptor monomers that may be used in the present invention include, but are not limited to, isobornyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, chlorotrifluoro ethylene, 2-ethylhexyl acrylate, vinyl halides, including, but are not limited to, vinyl chloride and vinylidene fluoride. Analogously, for structure 1, the monomer residues —$CH_2$—CH—C(O)—$R_3$ are present in the same amounts as the acceptor monomers.

The use of other acceptor monomers is optional and when other mild acceptor monomers are used, the residues of these monomers may be present in the copolymer at a level of at least 0.01 mol % of the copolymer composition, often at least 0.1 mol %, typically at least 1 mol %, and, in some cases, at least 2 mol %. The residues of the optional acceptor monomers may be present at up to 35 mol %, in some cases up to 25 mol %, typically up to 15 mol %, and, in some cases, up to 10 mol %.

The monomer composition used in the present method typically includes an olefin monomer having the formula $CH_2$=$CR^1R^2$, a monomer having the formula $CH_2$=CH—C(O)—$R^{3'}$ and optionally a monomer described by structure XVI described above. $R^1$, $R^2$ and $R^{3'}$ are as defined above. In an embodiment of the present invention, the olefin monomer is one or more selected from isobutylene, diisobutylene, dipentene, 1-octene and isoprenol and $R^{3'}$ is —O—$R^{33}$, where $R^{33}$ is $C_1$ to $C_4$ alkyl.

The olefin monomer XIX(C) is present in the monomer composition at a level of at least 10 mol %, in some cases at least 15 mol %, in other cases at least 20 mol % and in some situations at least 25 mol % of the monomer composition. Additionally, the olefin monomer may be present at up to 50 mol %, in some cases up to 45 mol %, in other cases up to 40 mol %, in some situations up to 35 mol %, in other situations up to 30 mol % and in particular cases up to 25 mol % of the monomer composition. The olefin monomer may be present in the monomer composition at a level ranging between any of those recited above.

The monomer XIX(D) having the formula $CH_2$=CH—C (O)—$R^{3'}$ is present in the monomer composition at a level of at least 10 mol %, in some cases at least 15 mol %, in other cases at least 20 mol % and in some situations at least 25 mol % of the monomer composition. Additionally, monomer having the formula $CH_2$=CH—C(O)—$R^{3'}$ may be present at up to 50 mol %, in some cases up to 45 mol %, in other cases up to 40 mol %, in some situations up to 35 mol %, in other situations up to 30 mol % and in particular cases up to 25 mol % of the monomer composition. The monomer having the formula $CH_2$=CH—C(O)—$R^{3'}$ may be present in the monomer composition at a level ranging between any of those recited above.

In an embodiment of the present invention, the post polymerization reactions may be carried out using, as non-limiting examples, the hydroxy functional compounds of structures XX-XXIX and/or the amine functional compounds selected from structures XXX and XXXI. In this embodiment, at least a portion of the groups $R^{3'}$ are converted to groups $R^3$ as defined above, non-limiting examples of which are described by structures II-XIV.

In the present invention, the monomer having the formula CH$_2$=CH—C(O)—R$^{3'}$ results in a polymer backbone monomer residue of structure XXXII:

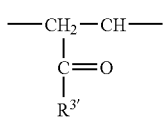

(XXXII)

where R$^{3'}$ is as defined above. A particular feature of the present copolymer is that residues having structure XXXII in the polymer backbone do not have adjacent or nearest neighbor monomer residues along the polymer backbone also having structure XXXII. Thus, the carbonyl containing moiety of structure XXXII is isolated along the polymer backbone. This isolation of the copolymer moieties that participate in the post polymerization reactions prevents the cyclization that often occurs in copolymers where moieties of structure XXXII are adjacent or nearest neighbors. No loss of functionality in the copolymer or unpredictable and/or undesirable changes in physical properties such as glass transition temperature, solubility or compatibility with other materials due to cyclization occurs.

As was mentioned above, the unit —CH$_2$—CH(CO—R$^3$)— in structure I may be obtained by hydrolyzing a nitrile containing moiety —CH$_2$—CH(CN)—. A common problem in such hydrolysis reactions is the formation of cyclic acid imides when the nitrile containing moieties are nearest neighbors (see for example, U.S. Pat. No. 4,683,286 to Krakkay et al., col. 5, lines 1-42, which is herein incorporated by reference). In the present invention, the occurrence of nearest neighbor nitrile containing moieties is minimized as is the occurrence of the undesirable cyclic acid imides.

While not wishing to be bound to any single theory, it is believed that the steric effects of the nearest neighbor monomer residues (not being like structure XXXII in nature) prevent the cyclization reaction from occurring. This trend seems to be particularly predominant when the nearest neighbor or adjacent monomer residue is derived from an olefin, non-limiting examples of which include of isobutylene, diisobutylene, dipentene and isoprenol.

In a particular embodiment of the present method, the hydroxy functional compounds that are reacted with the copolymer are hydroxy functional compounds that include amine functionality and the post polymerization reaction is carried out such that after the transesterification reaction the copolymer contains amine functionality. In a non-limiting example of this embodiment, the amine functionality is a primary amine.

In this particular embodiment, the esterification is carried out in the presence of an alkoxide. As used herein and in the claims, the term alkoxide refers to alkali metal salts of alkyl oxides, non-limiting examples of which include sodium methoxide and sodium butoxide.

In an embodiment of the present invention, the amine functional ester may be rearranged to the corresponding hydroxy functional amide by heating the amine functional ester. Typically, the amine functional ester is heated to a temperature of at least 140° C. in order for the rearrangement to take place.

In a non-limiting example, when the post polymerization reaction results in a copolymer with amine functionality, the resulting amine functional copolymer may be further reacted, for example, with phosgene, such that at least a portion of the amine functionality is converted to an isocyanate.

In a further non-limiting example, the amine functional copolymer may be reacted with an alkylene carbonate to form the corresponding alkylene hydroxy carbamate. Any suitable alkylene carbonate may be used. Suitable alkylene carbonates include, but are not limited to ethylene carbonate, propylene carbonate, butylene carbonate and those available commercially under the JEFFSOL tradename from Huntsman, Austin, Tex.

In an embodiment of the present polymerization method, the polymerization initiator and monomer having the formula CH$_2$=CH—C(O)—R$^{3'}$ are separately and simultaneously added to the olefin monomer having the formula CH$_2$=CR$^1$R$^2$ over a period of time. The monomer and initiator may be added to the olefin monomer over a period of at least 15 minutes, in some cases at least 20 minutes, typically at least 30 minutes, and, in some cases, at least 1 hour. The monomer composition and initiator may further be added to the olefin monomer over a period of up to 24 hours, in some cases up to 18 hours, typically up to 12 hours, and, in some cases, up to 8 hours. The time for adding the monomer must be sufficient to maintain a suitable excess of olefin monomer over other monomers to encourage the formation of alternating segments. The addition time is not so long as to render the process economically unfeasible on a commercial scale. The addition time may vary in any range of values inclusive of those stated above.

After mixing or during addition and mixing, polymerization of the monomers takes place. The present polymerization method can be run at any suitable temperature. Suitable temperature for the present method may be ambient, at least 50° C., in many cases at least 60° C., typically at least 75° C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

In an additional embodiment of the present invention, after the polymerization is complete, any unreacted olefin monomer can be substantially removed from the resulting copolymer composition by evaporation. Typically, the unreacted olefin monomer removal is facilitated by the application of a vacuum.

In an embodiment of the present invention, the composition includes the non-gelled copolymer described above and co-reactive functional groups. In a particular embodiment of the present invention, the composition is a thermosetting composition.

In a more particular embodiment, the composition includes the copolymer and at least one other component. In this embodiment, the copolymer contains reactive functional groups and the at least one other component contains functional groups that are reactive with the functional groups of the copolymer. Any suitable reactive functional groups may be included in the present invention.

Suitable reactive functional groups for the copolymer can include, but are not limited to epoxy, carboxylic acid, hydroxy, amide, oxazoline, aceto acetate, methylol, methylol ether, isocyanate, carbamate, amine, amine salt, polysulfide, thiol, and sulfonium salt. The copolymer may further include one or more suitable salt groups. Suitable salt groups can include, but are not limited to an amine salt or an onium salt group.

Suitable coreactive functional groups for the at least one other component can include, but are not limited to epoxy, carboxylic acid, hydroxy, polyol, thiol, isocyanate, capped isocyanate, amine, aminoplast, methylol, methylol ether, and beta-hydroxyalkylamide, and which are coreactive with the functional groups of the copolymer.

The suitable reactive functional groups of the copolymer may be present to provide a functional group equivalent weight of the copolymer of at least 100, for example, at least 200, or at least 500, or at least 750, or at least 1,000 grams/equivalent. Additionally, the suitable reactive functional groups of the copolymer may be present to provide a functional group equivalent weight of the copolymer of up to 10,000, such as up to 5,000, or up to 4,000, or up to 3,000, or up to 2,500 grams/equivalent. The equivalent weight of the functional groups of the copolymer may vary between any of the values recited above.

In one embodiment the present is directed to a thermosetting composition, wherein the coreactive functional groups are in the copolymer. Any suitable coreactive functional groups may be included in the present copolymer. Suitable coreactive functional groups can include, but are not limited to methylol, methylol ether, polysulfide and a group described by structure XXXII.

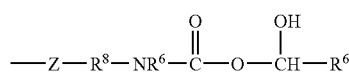

(XXXII)

In structure XXXII, Z is selected from —O— and —NR$^6$—, R$^6$ is independently selected from hydrogen and $C_1$ to $C_4$ alkyl and alkylol, and R$^8$ is a linking group selected from linear, cyclic or branched $C_2$ to $C_{20}$ alkylene, alkenylene, arylene, alkarylene, aralkylene and oxyalkalene. Additionally, suitable coreactive functional groups for the present copolymer may include the situation when the co-reactive functional groups are selected from the group consisting of epoxy, carboxylic acid, hydroxy, amide, oxazoline, aceto acetate, isocyanate, capped isocyanate, carbamate, thiol, sulfide, and beta-hydroxyalkylamide.

In order to achieve a suitable level of cure with the thermosetting composition of the present invention, the equivalent ratio of suitable reactive functional groups in the copolymer to suitable reactive functional groups in the at least one other component is typically from 0.7:1 to 2:1, e.g., from 0.8:1 to 1.3:1.

The thermosetting composition of the present invention may also include pigments and fillers. Examples of pigments include, but are not limited to, inorganic pigments, e.g., titanium dioxide and iron oxides; organic pigments, e.g., phthalocyanines, anthraquinones, quinacridones and thioindigos; carbon blacks and metallic pigments.

Examples of fillers include, but are not limited to, silica, e.g., precipitated silicas, clay, and barium sulfate. When used in the composition of the present invention, pigments and fillers can be present in amounts of from 0.1 percent to 70 percent by weight, based on the total weight of the thermosetting composition.

The thermosetting composition of the present invention may optionally contain additives that are well known in the art of formulating surface coatings. Non-limiting examples of such additives include waxes for flow and wetting, flow control agents, e.g., poly(2-ethylhexyl)acrylate, degassing additives such as benzoin, adjuvant resin to modify and optimize coating properties, antioxidants and ultraviolet (UV) light absorbers, surfactants, thixotropic agents, organic co-solvents, catalysts, and other customary auxiliaries.

In the thermosetting composition of the present invention, the copolymer is a non-gelled polymer having reactive functional groups and may include at least one other component (a crosslinking agent or curing agent as non-limiting examples) that contain reactive functional groups that are reactive with the functional groups in the copolymer. The non-gelled copolymer is typically present in the coating composition in amounts of 1 to 99, in some cases 5 to 75, in other cases 10 to 65, in some situations 50 to 85 and in other situations 50 to 70 percent by weight based on the total weight of resin solids. When the at least one other component is present, it is typically present in the coating composition in amounts of about 15 to 50, often about 30 to 50 percent by weight based on the total weight of resin solids.

The thermosetting composition may include other optional ingredients, such as the additives mentioned above.

When the thermosetting composition of the present invention is a particulate mixture or powder coating composition, it is typically prepared by first dry blending the functional copolymer, and any other components including those with and without functional groups, and additives, such as flow control agents, degassing agents, antioxidants and UV absorbing agents, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 15 to 30 microns.

When the thermosetting composition of the present invention is a liquid mixture, it is typically prepared by mixing the present composition containing the copolymer and other ingredients into a suitable solvent as is known in the art. Non-limiting suitable solvents include one or more volatile materials such as water, organic solvents and/or amines. The solids content of the liquid thermosetting composition will generally ranges from about 15 to about 60 weight percent, typically about 20 to about 50 weight percent. Also, other additional components usually found in liquid thermosetting compositions may be present in amounts usually used by those skilled in the art. The solids content is typically determined by heating a sample of the liquid thermosetting composition to 105°-110° C. for 1-2 hours to drive off the volatile material and measuring weight loss.

The thermosetting compositions described above may be used to coat any of a variety of substrates, hence, the present invention is further directed to a substrate, wherein at least a portion of the substrate is coated with the present thermosetting composition.

When the present thermosetting compositions are used to coat substrates, they may be in liquid or powder form and are typically applied using the following general method:

(A) applying the thermosetting coating composition described above over at least a portion of the substrate;

(B) coalescing the thermosetting coating composition to form a substantially continuous film on the substrate; and (C) curing the thermosetting coating composition.

The present invention is still further directed to a substrate coated by the above-described method.

The thermosetting coating composition can be applied as a free film. As used herein and in the claims, the term "free film" refers to a film unattached to any substrate, which film may be a single paint layer or a composite of paint layers. The free paint film is typically up to about 20 mils thick. The film may be of uniform thickness, for example to coat an entire article or surface thereof, or may be tapered to otherwise contoured, for example having tapered edges to blend into a pre-existing coating for spot repair During application of the thermosetting coating composition to the substrate, the film thickness of the coating formed on the substrate can range from 0.1 to 5 mils (2.54 to 127 micrometers). In another embodiment, the film thickness of the coating formed on the substrate can range 0.1 to 1 mils (2.54 to 25.4 micrometers), and can be 0.4 to 0.6 mils (10.2 to 15.2 micrometers). The coated substrate can be heated to a temperature and for a time sufficient to effect cure of the thermosetting composition applied thereto.

In an additional embodiment, the coating may be applied to a suitable substrate by extrusion coating, coextrusion coating and/or laminating technology as is known in the art. As a non-limiting example, extrusion or laminating coatings may be applied using the LA-FM or LA-FP Extrusion System Lamination Machine available from FKI Extrusion, Taiwan and the Extrusion, Coating and Laminating lines available from Black Clawson Converting Machinery LLC, Fulton, N.Y.

The powder coating thermosetting composition of the present invention may be applied to the substrate by any appropriate means that are known to those of ordinary skill in the art. Generally, the thermosetting composition is in the form of a dry powder and is applied by spray application. Alternatively, the powder can be slurried in a liquid medium such as water, and spray applied. Where the language "co-reactable solid, particulate mixture" is used in the specification and claims, the thermosetting composition can be in dry powder form or in the form of a slurry.

When the substrate is electrically conductive, the thermosetting composition can be electrostatically applied using application techniques well known in the art.

Alternatively, when the substrate is not electrically conductive, for example as is the case with many plastic substrates, the substrate can be preheated prior to application of the thermosetting composition. The preheated temperature of the substrate is equal to or greater than that of the melting point of the thermosetting composition, but less than its cure temperature The coalesced thermosetting composition is next cured by the application of heat. As used herein and in the claims, by "cured" is meant a three dimensional crosslink network formed by covalent bond formation, e.g., between the reactive functional groups of a crosslinking agent and the reactive functional groups of the copolymer. The temperature at which the thermosetting composition of the present invention is cured is variable and depends in part on the amount of time during which curing is conducted as well as the type of substrate to be coated. Typically, the thermosetting composition is cured at a temperature within the range of 149° C. to 204° C., e.g., from 154° C. to 177° C., for a period of 20 to 60 minutes.

The liquid coating thermosetting composition of the present invention may be applied to various substrates to which it adheres. The compositions can be applied by conventional means including brushing, dipping, flow coating, spraying and the like, but it is most often applied by spraying. The usual spray techniques and equipment for air spraying and electrostatic spraying by either manual or automatic methods can be used.

After application of the liquid coating thermosetting composition to the substrate, a film is formed on the surface of the substrate by driving solvent, i.e., organic solvent or water, out of the coating film by heating or by an air-drying period. Preferably, heating will only be for a short period of time, sufficient to ensure that any subsequent coating layers can be applied to the liquid thermosetting composition coating without the former dissolving the liquid coating composition. Suitable drying conditions will depend on the composition of the liquid thermosetting coating and on the ambient humidity with certain water-based compositions, but, in general, a drying time of from 1 to 5 minutes at a temperature of 20° C. to 120° C. will be adequate to ensure that mixing of the two coats is minimized.

The thermosetting coating compositions of the present invention can be applied over virtually any substrate including wood, metals, glass, cloth plastic, foam, including elastomeric substrates and the like. They are particularly useful in applications over metals and elastomeric substrates that are found, as a non-limiting example, on motor vehicles.

The thermosetting coating compositions of the present invention may be part of a multi-component composite coating composition that includes:

(a) a base coat deposited from a pigmented film-forming composition; and (b) a transparent top coat applied over said base coat.

Either or both of the base coat and the top coat may be any of the previously described thermosetting coating composition of the present invention as described above. The multi-component composite coating composition as described herein is commonly referred to as a color-plus-clear coating composition.

When the pigmented film-forming composition from which the base coat is deposited is not the present thermosetting coating composition, it may be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, and polyurethanes.

The resinous binders for the pigmented film-forming base coat composition can be organic solvent-based materials or water-based materials.

The pigmented film-forming base coat composition can be applied to the substrate by any of the conventional coating techniques such as brushing, spraying, dipping or flowing, but are most often applied by spraying. The usual spray techniques and equipment for air spraying, airless spray and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After forming the basecoat layer on at least a portion of the substrate from the pigmented film-forming base coat composition, and prior to application of the transparent top coat, the base coat can be cured or alternatively dried. In drying the deposited base coat, organic solvent and/or water, is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 20° C. to 120° C.

The substantially pigment-free (or clear) topcoat composition can be applied over the deposited base coat by any of the methods by which powder and liquid coatings are known to be applied, including, but not limited to, compressed air spraying, electrostatic spraying, and either manual or automatic methods. The clear topcoat can be applied to a cured or to a dried basecoat before the basecoat has been cured. In the latter instance, the two coatings can then be heated to cure both coating layers simultaneously. Typical curing conditions can range from 10° C. to 246° C. for 1 to 30 minutes. The clear topcoat thickness (dry film thickness) can range from 1 to 6 mils (25 to 150 micrometers).

When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 149° C. to 204° C. for a period of 20 to 30 minutes are employed. The transparent top coat typically has a thickness within the range of 0.5 to 6 mils (13 to 150 microns), e.g., from 1 to 3 mils (25 to 75 microns).

A second substantially pigment free topcoat coating composition can be applied to the first topcoat to form a "clear-on-clear" topcoat. The first topcoat coating composition can be applied over the basecoat as described above. The second topcoat coating composition which may be the same or different from the first topcoat composition can be applied to a cured or to a dried first topcoat before the basecoat and first topcoat have been cured. The basecoat, the first topcoat and the second topcoat can then be heated to cure the three coatings simultaneously.

In an embodiment of the present invention, the multi-layer composite coating includes a base coat layer deposited from the present thermosetting composition, where the thermosetting composition is a pigmented film-forming base coat composition; and a substantially pigment free top coat deposited over at least a portion of the base coat layer from a top coat composition.

In another embodiment of the present invention, the multi-layer composite coating includes a base coat layer deposited from a pigmented film-forming base coat composition; and a top coat layer deposited from the present thermosetting composition over at least a portion of the base coat layer, where the present thermosetting composition is a substantially pigment free film-forming top coat composition.

In an additional embodiment of the present invention, the multi-layer composite coating includes a base coat layer deposited from the present thermosetting composition, where the present thermosetting composition is a pigmented film-forming base coat composition and a top coat layer deposited from the present thermosetting composition over at least a portion of the base coat layer, where the present thermosetting composition is a substantially pigment free film-forming top coat composition.

The present invention is more particularly described in the following examples, which are intended to be illustrative only, since numerous modifications and variations therein will be apparent to those skilled in the art. Unless otherwise specified, all parts and percentages are by weight.

EXAMPLE 1

This example demonstrates the synthesis of an alternating copolymer of isobutylene and methyl acrylate. The copolymer was prepared using the ingredients outlined in the table below.

|  | Ingredients | Parts by weight (grams) |
|---|---|---|
| Charge 1 | Isobutylene | 1262.30 |
| Charge 2 | Di-t-amyl Peroxide | 82.90 |
| Charge 3 | Methyl Acrylate | 645.60 |

Charge 1 was added to a 4-liter stainless steel pressure reactor equipped with an agitator. The reactor was pressurized with nitrogen providing a 5 psi nitrogen pad in the reactor. The agitation on the reactor was set at 500 rpm and the reactor temperature was adjusted to 150° C. Charge 2 was added to the reactor at am addition rate of 33.2 g/hr over a 2.5-hour period. 15 minutes later, addition of Charge 3 was begun at an addition rate 430.5 g/hr over a 2-hour period. During the monomer addition the temperature was maintained at 150° C. at 500 psi. After the addition of charges 2 and 3 were complete, the reaction mixture was held for 2-hours. The reactor was then cooled to 25° C., and vented. Gas Chromatography (GC) analysis of the reaction mixture showed no unreacted acrylates. The reaction mixture was transferred to a 5-liter flask, and was vacuum-stripped at 130° C. The total solids of the recovered polymer was determined to be 94.25 wt. % at 110° C. for one hour. The copolymer had a number average molecular weight ($M_n$) of 1,100 and a polydispersity (PDI or $M_w/M_n$) of 2.4 as determined by gel permeation chromatography using polystyrene standards. A $^{13}$C NMR spectrum was consistent with a copolymer composition of 50 mole percent isobutylene and 50 mole percent methyl acrylate. The copolymer had a glass transition temperature (Tg) of −20° C.

EXAMPLE 2

This example demonstrates the synthesis of an alternating copolymer of isobutylene and methyl acrylate/butyl acrylate. The copolymer was prepared using the ingredients outlined in the table below.

|  | Ingredients | Parts by weight (grams) |
|---|---|---|
| Charge 1 | Isobutylene | 561.00 |
| Charge 2 | Di-t-amyl Peroxide | 110.50 |
| Charge 3 | Methyl Acrylate | 774.90 |
|  | Butyl Acrylate | 128.20 |

Charge 1 was added to a 4-liter stainless steel pressure reactor equipped with an agitator. The reactor was pressurized with nitrogen providing a 5 psi nitrogen pad in the reactor. The agitation on the reactor was set at 500 rpm and the reactor temperature was adjusted to 150° C. Charge 2 was added to the reactor at am addition rate of 44.5 g/hr over a 2.5-hour period. 15 minutes later, addition of Charge 3 was begun at an addition rate 451.6 g/hr over a 2-hour period. During the monomer addition the temperature was maintained at 150° C. at 500 psi. After the addition of charges 2 and 3 were complete, the reaction mixture was held for 2-hours. The reactor was then cooled to 25° C., and vented. Gas Chromatography (GC) analysis of the reaction mixture showed no unreacted acrylates. The reaction mixture was transferred to a 5-liter flask, and was vacuum-stripped at 130° C. The total solids of the recovered polymer was determined to be 94.78 wt. % at 110° C. for one hour. The copolymer had a $M_n$ of 1,500 and a PDI of 2.6 as determined by gel permeation chromatography using polystyrene standards. A $^{13}C$ NMR spectrum was consistent with a copolymer composition of 50 mole percent isobutylene, 10 mole percent butyl acrylate and 40 mole percent methyl acrylate.

EXAMPLE 3

This example demonstrates a transesterification reaction of the alternating copolymer isobutylene-alt-methyl acrylate of example 1 with 1,2-propanediol and benzyl alcohol.

The following were added to a one-liter, four-necked reaction vessel equipped with a thermometer, stirrer, nitrogen inlet, and means for removing the methanol reaction by-product:

142 g of the copolymer of example 1; and
30.4 g of 1,2-propanediol.

The reaction mixture was heated to 100° C. and then 2 g of sodium methoxide (30 wt. % solution in methanol) was added. The reaction mixture was held at 100° C. for 7 hours, during which time 16 grams of methanol was produced during the transesterification step and was removed and collected in a receiving flask. The resulting product was analyzed by GC, which indicated that the reaction was complete. Subsequently, 43.2 g of benzyl alcohol was added and the reaction mixture was held at 100° C. for 3 hours, during which time 14 grams of methanol was collected. The catalyst was removed by filtration through a magnesol cake. The resin had a $M_n$ of 2,100 and PDI of 2.7 as determined by gel permeation chromatography using polystyrene standards. A $^{13}C$ NMR spectrum was consistent with a copolymer composition of 50 mole percent isobutylene, 10 mole percent methyl acrylate, 20 mole percent hydroxypropyl acrylate, and 20 mole percent benzyl acrylate. The combination of $^{13}C$ NMR and GPC data did not indicate any substantial sign of branching or cyclization as a result of the reaction of the copolymer with 1,2-propanediol. The Tg of the copolymer was 4° C.

EXAMPLE 4

This example demonstrates the preparation of a coating composition using the copolymer of example 3. The coating composition was prepared by combining 70 g of the transesterified copolymer of example 3 with 30 g of melamine, Cymel 303 available from Cytec Industries, Inc., West Patterson, N.J., and 1 g of dodecylbenzene sulfonic acid as catalyst. The mixture was drawn down 3 mil thick over a steel panel primed with an electrocoat primer. The drawn down coating layer was baked for 30 minutes at 120° C. The resulting cured film was hard and passed a solvent resistance test consisting of 100 double rubs with acetone.

EXAMPLE 5

This example demonstrates a transesterification reaction of the alternating copolymer isobutylene-alt-methyl acrylate of example 1 with 1,4-cyclohexanedimethanol.

The following were added to a one-liter, four-necked reaction vessel equipped with a thermometer, stirrer, nitrogen inlet, and means for removing the methanol reaction by-product:

142 g of the copolymer of example 1; and
43.2 g of 1,4-cyclohexanedimethanol.

The reaction mixture was heated to 90° C. and 4 g of sodium methoxide (30 wt. % solution in methanol) was added. The reaction mixture was held at 90° C. for 4 hours during which time 8 grams of methanol was collected in a receiving flask. The sample was analyzed by GC and indicated that the reaction was complete. The catalyst was removed by filtration through a magnesol cake. The resulting product had a $M_n$ of 2,620 and PDI of 4 as determined by gel permeation chromatography using polystyrene standards. A $^{13}C$ NMR spectrum was consistent with a copolymer composition of 50 mole percent isobutylene, 20 mole percent methyl acrylate and 30 mole percent 1,4-cyclohexanedimethanol monoacrylate. The combination of $^{13}C$ NMR and GPC data did not indicate any substantial sign of branching or cyclization as a result of the reaction of the copolymer with 1,4-cyclohexanedimethanol.

EXAMPLE 6

This example demonstrates the preparation of a coating composition using the copolymer of example 5.

A coating composition was prepared by combining 70 g of the transesterified copolymer of example 5 with 30 g of melamine Cymel 303 and 1 g of dodecylbenzene sulfonic acid as catalyst. The mixture was drawn down to 3 mil thickness over a steel panel primed with an electrocoat primer. The drawn down coating layer was baked for 30 minutes at 120° C. The resulting cured film was hard and passed a solvent resistance test of 100 double rubs with acetone.

EXAMPLE 7

This example demonstrates a transesterification reaction of the alternating copolymer isobutylene-alt-methyl acrylate of example 1 with 1,4-butanediol.

The following were added to a one-liter, four-necked reaction vessel equipped with a thermometer, stirrer, nitrogen inlet, and means for removing the methanol reaction by-product:

142 g of the copolymer of example 1; and
27 grams of 1,4-butanediol.

The reaction mixture was heated at 90° C. and 3 g of sodium methoxide (30 wt. % solution in methanol) was added. The reaction mixture was held at 90° C. for 4 hours during which time 9 g of methanol was collected in a receiving flask. The sample was analyzed by GC and indicated that the reaction was complete. The resulting product had a $M_n$ of 2,060 and a PDI of 3.7 determined by gel permeation chromatography using polystyrene standards. The $^{13}C$NMR spectrum was consistent with a copolymer composition of 50 mole percent isobutylene, 20 mole percent methyl acrylate, and 30 mole percent 4-hydroxybutyl acrylate. The combination of $^{13}C$ NMR and GPC data did not indicate any substantial sign of branching or cyclization as a result of the reaction of the copolymer with 1,4-butanediol.

EXAMPLE 8

This example demonstrates the preparation of a coating composition using the copolymer of example 7.

A coating composition was prepared by combining 70 g of the transesterified copolymer of example 7 with 30 g of melamine Cymel 202 and 1 g of dodecylbenzene sulfonic acid as catalyst. The mixture was drawn down 3 mil thick over a steel panel primed with an electrocoat primer. The drawn down coating layer was baked for 30 minutes at 140° C. The resulting cured film was hard and passed a solvent resistance test of 100 double rubs with acetone.

EXAMPLE 9

This example demonstrates a transesterification reaction of the alternating copolymer isobutylene-alt-methyl acrylate/butyl acrylate of example 2 with 1,4-butanediol.

The following were added to a one-liter, four-necked reaction vessel equipped with a thermometer, stirrer, nitrogen inlet, and means for removing the methanol reaction by-product:

145 g of the copolymer of example 2; and
27 grams of 1,4-butanediol.

The reaction mixture was heated at 90° C. and 3 g of sodium methoxide (30 wt. % solution in methanol) was added. The reaction mixture was held at 90° C. for 4 hours during which time 9 g of methanol was collected in a receiving flask. The sample was analyzed by GC and indicated that the reaction was complete. The catalyst was removed by filtration through a magnesol cake. The resulting product had a $M_n$ of 2,500 and a PDI of 2.9 determined by gel permeation chromatography using polystyrene standards. The $^{13}$C NMR spectrum was consistent with a copolymer composition of 50 mole percent isobutylene, 10 mole percent methyl acrylate, 10 mole percent butyl acrylate and 30 mole percent 4-hydroxybutyl acrylate. The combination of $^{13}$C NMR and GPC data did not indicate any substantial sign of branching or cyclization as a result of the reaction of the copolymer with 1,4-butanediol.

EXAMPLE 10

This example demonstrates the preparation of a coating composition using the copolymer of example 9.

A coating composition was prepared by combining 70 g of the transesterified copolymer of example 9 with 30 g of melamine Cymel 202 and 1 g of dodecylbenzene sulfonic acid as catalyst. The mixture was drawn down 3 mil thick over a steel panel primed with an electrocoat primer. The drawn down coating layer was baked for 30 minutes at 140° C. The resulting cured film was hard and passed solvent resistance tests of 100 double rubs with acetone.

EXAMPLE 11

This example demonstrates a transesterification reaction of the alternating copolymer isobutylene-alt-methyl acrylate/butyl acrylate of example 2 with Hydroxyethyl carbamate.

The following were added to a one-liter, four-necked reaction vessel equipped with a thermometer, stirrer, nitrogen inlet, and means for removing the methanol reaction by-product:

142 g of the copolymer of example 1; and
73.5 grams of hydroxyethyl carbamate (available from Huntsman Corporation, Salt Lake City, Utah).

The reaction mixture was heated at 90° C. and 10 g of sodium methoxide (30 wt. % solution in methanol) was added. The reaction mixture was held at 90° C. for 3 hours during which time 24 g of methanol was collected in a receiving flask. The sample was analyzed by GC to confirm that the reaction was complete. The catalyst was removed by filtration through a magnesol cake. The resulting product had a $M_n$ of 1,800 and PDI of 2.1 determined by gel permeation chromatography using polystyrene standards. The $^{13}$C NMR spectrum was consistent with a copolymer composition of 50 mole percent isobutylene, 15 mole percent methyl acrylate, and 35 mole percent carbamatethyl acrylate. The combination of $^{13}$C NMR and GPC data did not indicate any substantial sign of branching or cyclization as a result of the reaction of the copolymer with hydroxyethyl carbamate.

EXAMPLE 12

This example demonstrates the preparation of a coating composition using the copolymer of example 11.

A coating composition was prepared by combining 70 g of the transesterified copolymer of example 11 with 30 g of melamine Cymel 303 and 1 g of dodecylbenzene sulfonic acid as catalyst. The mixture was drawn down 3 mil thick over steel panel primed with an electrocoat primer. The drawn down coating layer was baked for 30 minutes at 140° C. The resulting cured film was hard and passed a solvent resistance tests of 100 double rubs with acetone.

EXAMPLE 13

This example demonstrates a transesterification reaction of the alternating copolymer isobutylene-alt-methyl acrylate/butyl acrylate of example 2 with 2-(2-aminoethoxy)ethanol.

The following were added to a one-liter, four-necked reaction vessel equipped with a thermometer, stirrer, nitrogen inlet, and means for removing the methanol reaction by-product:

145 g of the copolymer of example 1; and
31.6 g of 2-(2-aminoethoxy)ethanol.

The reaction mixture was heated to 90° C. and 10 g of sodium methoxide (30 wt. % solution in methanol) was added. The reaction mixture was held at 90° C. for 3 hours during which time 10 g of methanol was collected in a receiving flask. The sample was analyzed by GC to confirm that the reaction was complete. The catalyst was removed by filtration through a magnesol cake. The resulting product had a $M_n$ of 2,500 and PDI of 1.9 determined by gel permeation chromatography using polystyrene standards. The combination of $^{13}$C NMR and GPC data did not indicate any substantial sign of branching or cyclization as a result of the reaction of the copolymer with 2-(2-aminoethoxy)ethanol. The resulting product had an 1.2 meq amine content.

EXAMPLE 14

This example demonstrates the preparation of a coating composition using the copolymer of example 13.

A coating composition was prepared by combining 90 g of the transesterified polyamine copolymer of example 13 with 20 g of epoxy EPON Resin 828 (polyglycidyl ether of Bisphenol A, available from Shell Chemical Co., Houston, Tex.) and 40 g of Dowanol PM (Dow Chemical Company, Midland, Mich.) as solvent. The mixture was drawn down 3 mil thick over a steel panel primed with an electrocoat primer. The drawn down coating layer was baked for 30 minutes at 120° C. The resulting cured film was hard and passed a solvent resistance test of 100 double rubs with acetone.

EXAMPLE 15

This example demonstrates a transamidation reaction of the alternating copolymer isobutylene-alt-methyl acrylate of example 1 with ethanolamine.

The following were added to a one-liter, four-necked reaction vessel equipped with a thermometer, stirrer, nitrogen inlet, and means for removing the methanol reaction by-product:

142 g of the copolymer of example 1; and 18.3 g of ethanolamine.

The reaction mixture was heated to 90° C. and 2 g of sodium methoxide (30 wt. % solution in methanol) was added. The reaction mixture was heated to 180° C. and held at that temperature for 4 hours during which time 10 grams of methanol, produced during the transamidation step, were removed and collected in a receiving flask. The resulting product was analyzed by GC, which indicated that the reaction was complete. The catalyst was removed by filtration through a magnesol cake. The resulting resin had a $M_n$ of 2,070 and PDI of 4.2 determined by gel permeation chromatography using polystyrene standards. The hydroxy value of the resin was 87. The combination of $^{13}C$ NMR and GPC data did not indicate any substantial sign of branching or cyclization as a result of the reaction of the copolymer with ethanolamine.

EXAMPLE 16

This example demonstrates the preparation of a coating composition using the copolymer of example 15.

A coating composition was prepared by combining 70 g of the resin of example 15 with 30 g of melamine Cymel 202 and 1 g of dodecylbenzene sulfonic acid as catalyst. The mixture was drawn down 3 mil thick over a steel panel primed with an electrocoat primer. The drawn down coating layer was baked for 30 minutes at 140° C. The resulting cured film was hard and passed a solvent resistance test of 100 double rubs with acetone.

EXAMPLE 17

This example demonstrates a transesterification reaction of the alternating copolymer isobutylene-alt-methyl acrylate of example 1 with 2-(2-aminoethoxy)ethanol.

The following were added to a three-liter, four-necked reaction vessel equipped with a thermometer, stirrer, nitrogen inlet, and means for removing the methanol reaction by-product:

846 g of the copolymer of example 1; and 577 g of 2-(2-aminoethoxy)ethanol.

The reaction mixture was heated to 90° C. and 34 g of sodium methoxide (30 wt. % solution in methanol) was added. The reaction mixture was held at 90° C. for 14 hours during which time 180 g of methanol was collected in a receiving flask. The sample was analyzed by GC to confirm that the reaction was complete. The catalyst was removed by filtration through a magnesol cake. The resulting product had a $M_n$ of 2,500 and PDI of 1.9 determined by gel permeation chromatography using polystyrene standards. The combination of $^{13}C$ NMR and GPC data did not indicate any substantial sign of branching or cyclization as a result of the reaction of the copolymer with 2-(2-aminoethoxy)ethanol. The resulting product had a 3.3 meq amine content.

EXAMPLE 18

This example demonstrates the synthesis of a hydroxy carbamate-functional crosslinking resin.

A 3-liter reactor equipped with a condenser, an addition funnel, a stirrer, and a thermocouple was charged with 1,040 grams of a 72 wt. % solution of polyamine resin of example 17 in Dowanol PM. The addition funnel was charged with 491 grams of 4-ethyl-1,3-dioxolan-2-one. The 4-ethyl-1,3-dioxolan-2-one was added over a 1 hour period with an exotherm peak of about 70° C. The amine content in the resulting resin was titrated as 0.4 meq.

EXAMPLE 19

This example demonstrates the synthesis of an active hydrogen-containing cationic resin prepared from the following ingredients:

| Ingredients | Parts by weight |
| --- | --- |
| EPON 828 | 614.68 |
| Bisphenol A-ethylene oxide (1:6 molar ratio) | 250.00 |
| Bisphenol A | 265.42 |
| Dowanol PM | 200.00 |
| Ethyltriphenyl phosphonium iodide | 0.60 |
| Diethanolamine | 58.89 |
| Diketimine[1] | 90.01 |
| Deionized Water | 8.64 |

[1]Diketimine derived from diethylene triamine and methyl isobutyl ketone (MIBK) (73% solids in MIBK).

A reaction vessel was charged with the EPON 828, Bisphenol A-ethylene oxide adduct, Bisphenol A and Dowanol PM. This mixture was heated under nitrogen blanket to 125° C. Ethyl triphenylphosphoniun iodide was then added and the reaction mixture allowed to exotherm to a temperature of about 145° C. The reaction was held at 145° C. for two hours and the epoxy equivalent weight was determined. At this point, the diketimine, and diethanolamine were added in succession and the reaction mixture maintained at 122° C. for one hour. Water was added slowly at 90° C. and stirred at this temperature for one hour.

EXAMPLE 20

This example demonstrates the preparation of a coating composition using the hydroxy carbamate-functional crosslinking resin of example 18 and the active hydrogen-containing cationic resin of example 19.

A coating composition was prepared by combining 15.4 g of the carbamate crosslinking resin of example 18 with 16.5 g of the active hydrogen-containing cationic resin of example 19, 5 g of 2-buthoxyethanol as a solvent, and 0.14 g of dibutyltindioleate as a catalyst. The mixture was drawn down at 4 mils thick over a primed zinc phosphated steel panel. The drawn down coating layer was baked for 60 minutes at 120° C. The resulting cured film was hard and passed solvent resistance tests of 100 double rubs with acetone.

EXAMPLE 21

This is an example of the synthesis of an alternating copolymer of diisobutylene and 4-hydroxybutyl acrylate/butyl acrylate. The copolymer was prepared using the ingredients outlined in the table below.

| | Ingredients | Parts by weight (grams) |
| --- | --- | --- |
| Charge 1 | Diisobutylene | 4480.00 |
| | Dowanol PM | 200.00 |
| Charge 2 | t-Amylperoxy(2-ethyl hexanoate) - Luperox 575 | 144.00 |
| Charge 3 | 4-Hydroxybutyl Acrylate | 432.00 |
| | Butyl Acrylate | 384.00 |

Charge 1 was added to a reaction flask equipped with an agitator, a thermocouple, and a $N_2$ inlet, placed under blanket of $N_2$, and heated to 103° C. Charge 2 was added to the reaction flask over a 3.5-hour period. After 15 minutes, addition of charge 3 was begun over a period of 3 hours. During the monomer addition the temperature was maintained at 103° C. After the addition of charges 2 and 3 were complete, the reaction mixture was held for 2 hours. The reaction flask was then cooled to 25° C. GC analysis of the reaction mixture indicated that all acrylates were reacted. The reaction flask was than equipped for simple vacuum distillation, the reaction mixture was heated to 80° C. to remove the unreacted diisobutylene, and the solvent. The solids of the resulting polymer was determined to be 94.22 wt. %, determined at 110° C. for one hour. The copolymer had a $M_n$ of 1,710 and a PDI of 1.9 determined by gel permeation chromatography using polystyrene as a standard. The $^{13}C$ NMR spectrum was consistent with a copolymer composition of 42.6 mole percent diisobutylene, 28.7 mole percent 4-hydroxybutyll acrylate and 28.7 mole percent butyl acrylate.

EXAMPLE 22

This example demonstrates the synthesis of a transcarbamoylated diisobutylene-alt-4-hydroxybutyl acrylate/butyl acrylate resin prepared form the following ingredients.

|  | Ingredients | Parts by weight (grams) |
| --- | --- | --- |
| Charge 1 | Resin of Example 21 | 532.0 |
|  | Methyl carbamate | 75.0 |
|  | DOWANOL PM[1] | 135.0 |
|  | Butyl stannoic acid | 1.15 |
|  | Triphenylphosphite | 1.15 |
| Charge 2 | 2-methyl-1-propanol | 182.0 |

[1] 1-methoxy-2-propanol, available from Dow Chemical.

Charge 1 was added to a reaction flask equipped with a thermocouple, an overhead stirrer, a $N_2$ inlet, a short fractionating column packed with ceramic saddles, a distillation head equipped with a thermocouple, a condenser, and a distillate receiver. The reaction mixture was heated to between 1430 and 154° C., during which time 69 g of distillate was collected in the receiver. During the distillation, the distillation head temperature was maintained below 70° C. When no further distillate could be collected at 154° C., the reaction mixture was cooled to 140° C. and the flask was equipped for vacuum distillation. At 140° C., the pressure of the flask was gradually reduced with removal of distillate. When a pressure of 60 mm Hg was attained, the temperature of the reaction mixture was raised to 150° C. and held until no more distillate was recovered.

At this point the vacuum was broken, the reaction mixture was sampled, and charge 2 was added to the reaction flask. Prior to the addition of Charge 2, the reaction product was found to have a hydroxyl value of 21.7. The resulting polymer solution had a measured solids of 72.3% (110° C., 1 hr), a Gardner-Holt bubble tube viscosity of U, and a $M_n$ of 1385 and a PDI of 2.2 as determined by gel permeation chromatography using polystyrene standards. The combination of $^{13}C$ NMR and GPC data did not indicate any substantial sign of branching or cyclization as a result of the post-polymerization reaction of the copolymer.

EXAMPLE 23

This example demonstrates the synthesis of an aminoplast based on a carbamoylated diisobutylene resin. The resin was prepared from the following ingredients.

|  | Ingredients | Parts by weight (grams) |
| --- | --- | --- |
| Charge 1 | Resin of Example 22 | 327.9 |
|  | 2-methyl-1-propanol | 133.2 |
|  | 53% n-BuOH/40% formaldehyde solution | 67.5 |
|  | Phosphorous acid | 2.52 |

Charge 1 was added to a reaction flask equipped with a thermocouple, an overhead stirrer, a $N_2$ inlet, a condenser, and a Dean-Stark trap primed with 2-methyl-1-propanol. The reaction mixture was heated to reflux (102° C.), at which time $H_2O$ began to collect in the Dean-Stark trap. When 4 g of $H_2O$ had been collected, an additional 2.52 g of phosphorous acid was added to the reaction mixture. The temperature of the reaction mixture was gradually increased to 113° C., at which time no additional $H_2O$ was collected. The total amount of $H_2O$ collected was 14 g. The resulting polymer solution had a measured solids of 53.1% (110° C., 1 hr), a Gardner-Holt bubble tube viscosity of B, an acid value of 12, an $M_n$ of 1,712 and a PDI of 3.08 as determined by gel permeation chromatography using polystyrene standards. The combination of $^{13}C$ NMR and GPC data did not indicate any substantial sign of branching or cyclization as a result of the post-polymerization reaction of the copolymer.

EXAMPLE 24

This example demonstrates the preparation of coating compositions using the diisobutylene carbamate aminoplast resin of example 23. The coating compositions was prepared using the following ingredients.

| Composition | Component | Parts by wt. (grams) |
| --- | --- | --- |
| Coating Composition A | Resin of Example 21 | 20.2 |
|  | Dodecylbenzenesulfonic acid (70% solution in isopropanol) | 0.21 |
| Coating Composition B | Resin of Example 23 | 20.1 |
|  | Dodecylbenzenesulfonic acid (70% solution in isopropanol) | 0.16 |

The two coating compositions were drawn down on steel panels coated with an electrodeposition primer, allowed to flash for 10 minutes, and baked in an oven for 30 minutes at 140° C. The cure response was evaluated via methyl ethyl ketone (MEK) double rubs. The results are summarized in the following table:

| Composition | MEK resistance (double rubs) | Comments |
| --- | --- | --- |
| Coating Composition A | <5 | Very tacky to touch |
| Coating Composition B | 100 | Not tacky; scrapable with fingernail at site of MEK rubs immediately after test |

The data demonstrate that the aminoplast modified carbamate resin exhibits superior crosslinking compared to the unmodified control. The present invention has been described with reference to specific details of particular embodiments thereof. It is not intended that such details be regarded as limitations upon the scope of the invention except insofar as and to the extent that they are included in the accompanying claims.

The present invention has been described with reference to specific details of particular embodiments thereof. It is not intended that such details be regarded as limitations upon the scope of the invention except insofar as and to the extent that they are included in the accompanying claims.

We claim:

1. A method of making a copolymer comprising the steps of:
   (a) providing a monomer composition comprising:
      (i) at least one monomer having the formula $CH_2=CR^1R^2$, wherein $R^1$ is a linear or branched $C_1$ to $C_4$ alkyl, and $R^2$ is selected from the group consisting of methyl, linear, cyclic or branched $C_2$ to $C_{20}$ alkyl, alkenyl, aryl, alkaryl and aralkyl; and
      (ii) at least one monomer having the formula $CH_2=CH-C(O)-R^3$;
   (b) polymerizing the monomer composition to form a copolymer; and reacting the copolymer by reacting the monomer (ii) functionality with a reactant selected from hydroxy functional compounds and amine functional compounds to form a non-gelled reacted copolymer, wherein $-C(O)-R^3$ is a group that is capable of a reaction selected from transesterification, transamidification and hydrolysis with the reactant.

2. The method of claim 1, wherein the copolymer in (b) is a copolymer comprising residues of the formula:

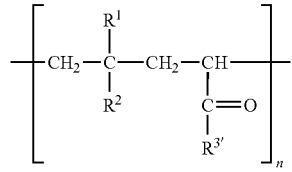

wherein n is an integer of from 1 to 10,000, $R^1$ is linear or branched C1 to C4 alkyl; $R^2$ is selected from the group consisting of methyl, linear, cyclic or branched $C_2$ to $C_{20}$ alkyl, alkenyl, aryl, alkaryl and aralkyl and $-C(O)-R^{3'}$ is a group capable of participation in one or more reactions selected from transesterification, transamidification and hydrolysis.

3. The method of claim 1, wherein the hydroxy functional compounds are selected from the group consisting of

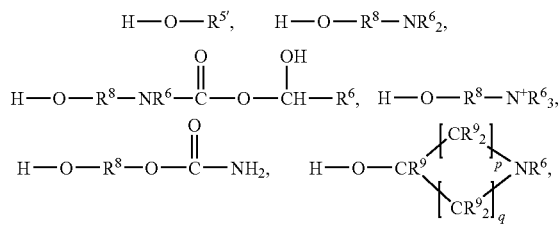

and the amine functional compounds are selected from the group consisting of $H-NR^6-R^7$, and $-NR^6-R^{17}-NR^6R^7$, wherein each occurrence of $R^4$ is independently selected from hydrogen and $C_1$ to $C_4$ alkyl, $R^{5'}$ is a radical selected from the group consisting of linear, cyclic or branched $C_2$ to $C_{20}$ alkyl, alkenyl, aryl, alkaryl, aralkyl, alkylol, aralkylol, alkyl thiol, aralkyl thiol, alkyl isocyanate, aralkyl isocyanate, blocked alkyl isocyanate, blocked alkaryl isocyanate and radicals derived from, polyesters, polyethylene glycol and polypropylene glycol, each occurrence of $R^6$ is independently selected from hydrogen and $C_1$ to $C_4$ alkyl and alkylol, $R^7$ is selected from the group consisting of H, methyl, linear, cyclic or branched $C_2$ to $C_{20}$ alkyl, alkenyl, aryl, alkaryl, aralkyl, alkylol, aralkylol, alkyl thiol, aralkyl thiol and polyamide radicals, $R^8$ is a linking group selected from the group consisting of linear, cyclic or branched $C_2$ to $C_{20}$ alkylene, alkenylene, arylene, alkarylene, aralkylene and oxyalkalene, $R^{16}$ is selected from hydrogen, $C_1$ to $C_4$ alkyl, $-OH$, $-OR^7$ and $-C(O)-R^7$, $R^{17}$ is a radical derived from polyethylene glycol, polypropylene glycol and mixtures thereof, p and q are each independently from 0 to 6 and the sum of p+q is at least 2 and not more than 8, each occurrence of $R^9$ is independently selected from hydrogen and $C_1$ to $C_4$ alkyl, and X is an anion derived from one or more organic or inorganic acids.

4. The method of claim 1, wherein the reacted copolymer in (c) comprises residues having the following structural units (I):

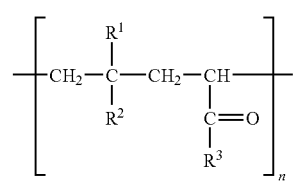

(I)

wherein n is an integer from 1 to 10,000; $R^1$ is linear or branched $C_1$ to $C_4$ alkyl; $R^2$ is selected from the group consisting of methyl, linear, cyclic or branched $C_2$ to $C_{20}$ alkyl, alkenyl, aryl, alkaryl and aralkyl, and $R^3$ is one or more selected from the group consisting of

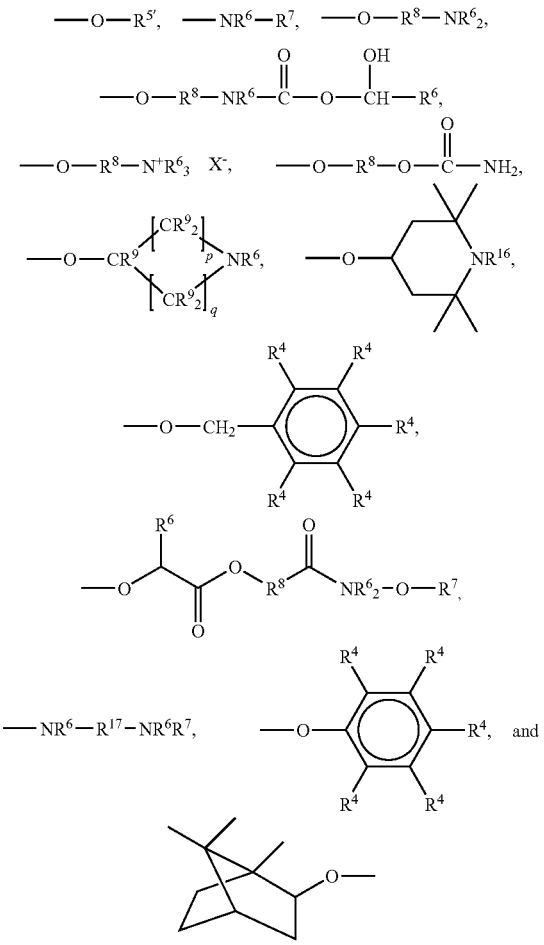

wherein each occurrence of $R^4$ is independently selected from hydrogen and $C_1$ to $C_4$ alkyl, $R^{5'}$ is a radical selected from the group consisting of linear, cyclic or branched $C_2$ to $C_{20}$ alkyl, alkenyl, aryl, alkaryl, aralkyl, alkylol, aralkylol, alkyl thiol, aralkyl thiol, alkyl isocyanate, aralkyl isocyanate, blocked alkyl isocyanate, blocked alkaryl isocyanate and radicals derived from, polyesters, polyethylene glycol and polypropylene glycol, each occurrence of $R^6$ is independently selected from hydrogen and $C_1$ to $C_4$ alkyl and alkylol, $R^7$ is selected from the group consisting of H, methyl, linear, cyclic or branched $C_2$ to $C_{20}$ alkyl, alkenyl, aryl, alkaryl, aralkyl, alkylol, aralkylol, alkyl thiol, aralkyl thiol and polyamide radicals, $R^8$ is a linking group selected from the group consisting of linear, cyclic or branched $C_2$ to $C_{20}$ alkylene, alkenylene, arylene, alkarylene, aralkylene and oxyalkalene, $R^{16}$ is selected from hydrogen, $C_1$ to $C_4$ alkyl, —OH, —O$R^7$ and —C(O)—$R^7$, $R^{17}$ is a radical derived from polyethylene glycol, polypropylene glycol and mixtures thereof, p and q are each independently from 0 to 6 and the sum of p+q is at least 2 and not more than 8, each occurrence of $R^9$ is independently selected from hydrogen and $C_1$ to $C_4$ alkyl, and X is an anion derived from one or more organic or inorganic acids.

5. The method of claim 1, wherein the monomer having the formula $CH_2$=$CR^1R^2$ is one or more olefin monomers selected from the group consisting of isobutylene, diisobutylene, dipentene and isoprenol.

6. The method of claim 1, wherein the group $R^{3'}$ is —O—$R^{33}$ where $R^{33}$ is $C_1$ to $C_4$ alkyl.

7. The method of claim 1, wherein the hydroxy functional compounds include amine functionality such that after the transesterification reaction the copolymer contains amine functionality.

8. The method of claim 7, wherein the amine functionality is primary.

9. The method of claim 7, comprising the step of reacting the reacted copolymer with phosgene such that at least a portion of the amine functionality is converted to an isocyanate.

10. The method of claim 8, wherein the amine functionality is reacted with an alkylene carbonate to form the corresponding alkylene hydroxy carbamate.

11. The composition of claim 10, wherein the alkylene carbonate is selected from the group consisting of ethylene carbonate, propylene carbonate and butylene carbonate.

12. The method of claim 1, wherein the monomer having the formula $CH_2$=$CR^1R^2$ is present at a molar excess of at least 10 mol % based on the total monomer composition.

13. The method of claim 1, wherein polymerizing the monomer composition in (b) is a free radical polymerization process.

14. The method of claim 13, wherein a thermal free radical initiator is used in the free radical polymerization process.

15. The method of claim 14 wherein the thermal free radical initiator is selected from the group consisting of a peroxide compound, an azo compound and a persulfate compound.

16. The method of claim 15 wherein the peroxide compound is one or more selected from the group consisting of hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides and peroxyketals.

17. The method of claim 15 wherein the azo compound is one or more selected from the group consisting of 4-4'-azobis (4-cyanovaleric acid), 1-1,'-azobiscyclohexanecarbonitrile), 2-2'-azobisisobutyronitrile, 2-2'-azobis(2-methylpropionamidine) dihydrochioride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N, N'-dimethyleneisobutyramidine) dihydrochloride and 2-(carbamoylazo)-isobutyronitrile.

18. The method of claim 1, wherein polymerizing the monomer composition in (b) is a controlled radical polymerization process.

19. The method of claim 18 in which the controlled radical polymerization process is atom transfer radical polymerization or group transfer polymerization.

20. The method of claim 1, wherein the monomer having the formula $CH_2$=CH—C(O)—$R^{3'}$ and a polymerization initiator are separately and simultaneously added to the monomer having the formula $CH_2$=$CR^1R^2$ over a period of time of from 30 minutes to 12 hours.

21. The method of claim 1, wherein after the polymerization in (b), any unreacted monomer having the formula $CH_2$=$CR^1R^2$ is substantially removed from the resulting copolymer composition by evaporation.

22. The method of claim 21, wherein the removal of unreacted monomer is facilitated by the application of a vacuum.

23. The method of claim 2, wherein the residues of said formula in the copolymer in (b) are derived from a nitrile containing copolymer that has been hydrolyzed.

24. A method of making a copolymer comprising the steps of:
  (a) providing a monomer composition comprising:
    (i) at least one monomer having the formula $CH_2=CR^1R^2$, wherein $R^1$ is a linear or branched $C_1$ to $C_4$ alkyl, and $R^2$ is selected from the group consisting of methyl, linear, cyclic or branched $C_2$ to $C_{20}$ alkyl, alkenyl, aryl, alkaryl and aralkyl; and
    (ii) at least one monomer having the formula $CH_2=CH-C(O)-R^3$;
  (b) polymerizing the monomer composition to form a copolymer; and
  (c) reacting the copolymer by reacting the monomer (ii) functionality with a reactant selected from amine functional compounds to form a non-gelled reacted copolymer, wherein
  $-C(O)-R^3$ is a group that is capable of a reaction selected from transesterification, transamidification and hydrolysis with the reactant.

25. A method of making a copolymer comprising the steps of:
  (a) providing a monomer composition comprising:
    (i) at least one monomer having the formula $CH_2=CR^1R^2$, wherein $R^1$ is a linear or branched $C_1$ to $C_4$ alkyl, and $R^2$ is selected from the group consisting of methyl, linear, cyclic or branched $C_2$ to $C_{20}$ alkyl, alkenyl, aryl, alkaryl and aralkyl; and
    (ii) at least one monomer having the formula $CH_2=CH-C(O)-R^3$;
  (b) polymerizing the monomer composition to form a copolymer; and
  (c) reacting the copolymer by reacting the monomer (ii) functionality with a reactant selected from hydroxy functional compounds to form a non-gelled reacted copolymer, wherein $-C(O)-R^3$ is a group that is capable of a reaction selected from transesterification, transamidification and hydrolysis with the reactant.

* * * * *